United States Patent
Kono et al.

(10) Patent No.: US 10,472,436 B2
(45) Date of Patent: Nov. 12, 2019

(54) OLEFIN-POLYMERIZATION SOLID CATALYTIC COMPONENT, PRODUCTION METHOD FOR OLEFIN-POLYMERIZATION CATALYST, AND PRODUCTION METHOD FOR OLEFIN POLYMER

(71) Applicant: TOHO TITANIUM CO., LTD., Chigasaki-shi, Kanagawa (JP)

(72) Inventors: Hiroyuki Kono, Chigasaki (JP); Toshiya Uozumi, Chigasaki (JP); Shingo Yamada, Chigasaki (JP); Toshihiko Sugano, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 0 days.

(21) Appl. No.: 15/542,149

(22) PCT Filed: Jan. 18, 2016

(86) PCT No.: PCT/JP2016/051281
§ 371 (c)(1),
(2) Date: Jul. 7, 2017

(87) PCT Pub. No.: WO2016/121551
PCT Pub. Date: Aug. 4, 2016

(65) Prior Publication Data
US 2018/0265612 A1    Sep. 20, 2018

(30) Foreign Application Priority Data
Jan. 30, 2015 (JP) .................. 2015-017403

(51) Int. Cl.
*C08F 110/06* (2006.01)
*C08F 4/658* (2006.01)
*C08F 10/00* (2006.01)

(52) U.S. Cl.
CPC .......... *C08F 110/06* (2013.01); *C08F 4/658* (2013.01); *C08F 10/00* (2013.01); *C08F 2410/01* (2013.01)

(58) Field of Classification Search
CPC .................................... C08F 110/06
See application file for complete search history.

(56) References Cited

U.S. PATENT DOCUMENTS

2007/0015862 A1    1/2007  Hong et al.
2009/0253874 A1*  10/2009  Hosaka .............. C08F 10/00
                                                 526/125.3

(Continued)

FOREIGN PATENT DOCUMENTS

CN    103665204 A    3/2014
EP    0441620 A2    8/1991

(Continued)

OTHER PUBLICATIONS

International Search Report dated Mar. 15, 2016, issued in counterpart of International Application No. PCT/JP2016/051281 (2 pages).

(Continued)

*Primary Examiner* — Catherine S Branch
(74) *Attorney, Agent, or Firm* — Westerman, Hattori, Daniels & Adrian, LLP

(57) ABSTRACT

A solid catalyst component for olefin polymerization exhibits excellent catalytic activity during polymerization, and can produce a polymer that exhibits excellent stereoregularity, bulk density, and the like even when a polymerization catalyst is produced in an inert atmosphere using an electron donor compound other than a phthalic ester and an organosilicon compound. The solid catalyst component for olefin polymerization is produced by bringing a vinylsilane compound (d) into contact with a catalyst component, the catalyst component being a powdery solid component (Continued)

obtained by bringing a magnesium compound (a), a titanium halide compound (b), and an electron donor compound (c) into contact with each other, the electron donor compound (c) being one or more compounds that do not include a phthalic ester structure, and include one or more groups selected from an ester group, a carbonate group, and an ether group, the vinylsilane compound (d) being brought into contact with the catalyst component in a 0.1 to 15-fold molar quantity with respect to the molar quantity (on a titanium atom basis) of the titanium halide compound (b) included in the catalyst component.

17 Claims, 1 Drawing Sheet

(56) References Cited

U.S. PATENT DOCUMENTS

| | | | |
|---|---|---|---|
| 2010/0273641 A1* | 10/2010 | Chen | C08F 110/06 502/126 |
| 2014/0058053 A1 | 2/2014 | Fang et al. | |

FOREIGN PATENT DOCUMENTS

| | | |
|---|---|---|
| EP | 2360190 A1 | 8/2011 |
| EP | 2730590 A1 | 5/2014 |
| JP | 57-63310 A | 4/1982 |
| JP | 2007-504293 A | 3/2007 |
| JP | 2012-214556 A | 11/2012 |
| JP | 2014-189689 A | 10/2014 |
| JP | 2014-214178 A | 11/2014 |
| WO | 2014/004396 A1 | 1/2014 |

OTHER PUBLICATIONS

Extended (supplementary) European Search Report dated Jul. 30, 2018, issued in counterpart European Application No. 16743155.0. (10 pages).

\* cited by examiner

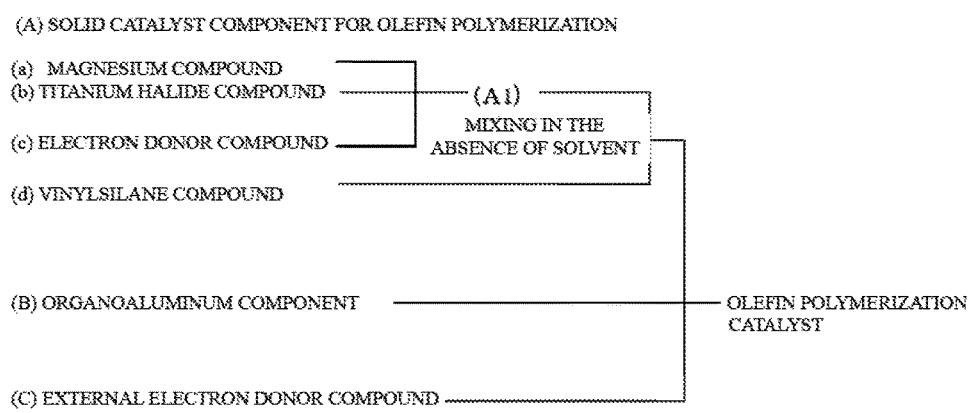

OLEFIN-POLYMERIZATION SOLID CATALYTIC COMPONENT, PRODUCTION METHOD FOR OLEFIN-POLYMERIZATION CATALYST, AND PRODUCTION METHOD FOR OLEFIN POLYMER

TECHNICAL FIELD

The present invention relates to a solid catalyst component for olefin polymerization, a method for producing an olefin polymerization catalyst, and a method for producing an olefin polymer.

BACKGROUND ART

A solid catalyst that includes a transition metal catalyst component (e.g., titanium) and a main group metal catalyst component (e.g., aluminum) has been widely known as an olefin polymerization catalyst.

An olefin polymerization catalyst that utilizes a magnesium compound as a support exhibits remarkably improved polymerization activity. A polymer that exhibits high stereoregularity can be produced from an α-olefin having 3 or more carbon atoms by adding an electron donor such as an ester compound to the catalyst.

For example, Patent Literature 1 (JP-A-57-63310) discloses a method that polymerizes propylene using a solid titanium catalyst component that supports an electron donor such as a phthalic acid ester, an organoaluminum compound (co-catalyst), and an organosilicon compound that includes at least one Si—O—C linkage. A number of pieces of literature including Patent Literature 1 disclose a method for producing a polymer having high stereoregularity in high yield using a phthalic acid ester as an electron donor compound.

However, di-n-butyl phthalate and benzylbutyl phthalate (i.e., phthalic acid ester) are designated as substances of very high concern (SVHC) specified by Registration, Evaluation, Authorization and Restriction of Chemicals (REACH), and a catalyst system that is not so designated has been desired from the viewpoint of a reduction in environmental load.

A solid catalyst component that utilizes a succinic acid ester, a maleic acid ester, a malonic acid ester, a diether, or the like (that does not fall under the SVHC) as an electron donor compound is known.

CITATION LIST

Patent Literature

Patent Literature 1: JP-A-57-63310

SUMMARY OF INVENTION

Technical Problem

However, since a solid catalyst component that utilizes an electron donor compound that does not fall under the SVHC normally does not exhibit a performance equal to that of a solid catalyst component that utilizes a phthalic acid ester, a further improvement has been desired. In particular, a solid catalyst component that utilizes an electron donor compound that does not fall under the SVHC tends to exhibit significantly decreased activity when used for a polymerization process that includes a process that brings the solid catalyst component into contact with an organoaluminum compound and an external electron donor compound in an inert gas atmosphere (e.g., nitrogen atmosphere).

An organosilicon compound or the like is widely used for an olefin polymerization catalyst as an electron donor compound. The inventors conducted studies, and found that, when a vinylsilane compound is used as an electron donor compound, the vinylsilane compound easily volatilizes and disappears during drying under reduced pressure when producing a solid catalyst component or a polymerization catalyst, whereby the desired effect may not be obtained.

In view of the above situation, an object of the invention is to provide a solid catalyst component for olefin polymerization that exhibits excellent catalytic activity during polymerization, and can produce a polymer that exhibits excellent stereoregularity, bulk density, and the like, even when a polymerization catalyst is produced in an inert atmosphere, when the solid catalyst component includes an electron donor compound other than a phthalic acid ester, and a vinylsilane compound, a method for producing an olefin polymerization catalyst, and a method that easily and inexpensively produces an olefin polymer using the solid catalyst component for olefin polymerization.

Solution to Problem

The inventors conducted extensive studies in order to solve the above technical problem. As a result, the inventors found the above technical problem can be solved by a solid catalyst component for olefin polymerizations that is produced by bringing a vinylsilane compound (d) into contact with a catalyst component, the catalyst component being a powdery solid component obtained by bringing a magnesium compound (a), a titanium halide compound (b), and an electron donor compound (c) into contact with each other, the electron donor compound (c) being one or more compounds that do not include a phthalic acid ester structure, and include one or more groups selected from an ester group, a carbonate group, and an ether group, the vinylsilane compound (d) being brought into contact with the catalyst component in a 0.1 to 15-fold molar quantity with respect to the molar quantity (on a titanium atom basis) of the titanium halide compound (b) included in the catalyst component. This finding has led to the completion of the invention.

Specifically, several aspects of the invention provide the following.

(1) A solid catalyst component for olefin polymerization that is produced by bringing a vinylsilane compound (d) into contact with a catalyst component, the catalyst component being a powdery solid component obtained by bringing a magnesium compound (a), a titanium halide compound (b), and an electron donor compound (c) into contact with each other, the electron donor compound (c) being one or more compounds that do not include a phthalic acid ester structure, and include one or more groups selected from an ester group, a carbonate group, and an ether group, the vinylsilane compound (d) being brought into contact with the catalyst component in a 0.1 to 15-fold molar quantity with respect to the molar quantity (on a titanium atom basis) of the titanium halide compound (b) included in the catalyst component.

(2) The solid catalyst component for olefin polymerization according to (1), wherein the electron donor compound (c) is at least one compound selected from a succinic acid ester, a maleic acid ester, a cyclohexenecarboxylic acid ester, an ether carboxylic acid ester, a dicarbonate, and an ether carbonate.

(3) The solid catalyst component for olefin polymerization according to (1) or (2), wherein the vinylsilane compound (d) is a compound represented by the following general formula (I), $$(CH_2\!\!=\!\!CH\!-\!)_p SiR^1_q X_{4-p-q} \qquad (I)$$

wherein $R^3$ is a hydrogen atom or a hydrocarbon residue having 1 to 20 carbon atoms, X is a halogen atom, p is a number from 1 to 4, q is a number that satisfies $p+q\leq 4$, provided that a plurality of $R^1$ are either identical to or different from each other when a plurality of $R^1$ are present, and a plurality of X are either identical to or different from each other when a plurality of X are present.

(4) The solid catalyst component for olefin polymerization according to any one of (1) to (3), wherein the vinylsilane compound (d) is a compound represented by the following general formula (II), $$(CH_2\!\!=\!\!CH\!-\!)SiR^2 R^3 R^4 \qquad (II)$$

wherein $R^2$, $R^3$, and $R^4$ are independently a hydrogen atom, or a group selected from a group derived from a saturated hydrocarbon compound having 1 to 10 carbon atoms, a group derived from a halogen-containing saturated hydrocarbon compound having 1 to 10 carbon atoms, a group derived from an aromatic hydrocarbon compound having 6 to 20 carbon atoms, and a group derived from a halogen-containing aromatic hydrocarbon compound having 6 to 20 carbon atoms, provided that $R^2$, $R^3$, and $R^4$ are either identical to or different from each other.

(5) The solid catalyst component for olefin polymerization according to any one of (1) to (4), the solid catalyst component being produced by bringing the vinylsilane compound (d) into contact with the catalyst component at a temperature of 0 to 80° C. for 1 minute or more in the absence of an organoaluminum compound (B) and an external electron donor compound (C).

(6) A method for producing an olefin polymerization catalyst including: bringing a vinylsilane compound (d) into contact with a catalyst component in the absence of an organoaluminum compound and an external electron donor compound, the catalyst component being a powdery catalyst component obtained by bringing a magnesium compound (a), a titanium halide compound (b), and an electron donor compound (c) into contact with each other, the electron donor compound (c) being one or more compounds that do not include a phthalic acid ester structure, and include one or more groups selected from an ester group, a carbonate group, and an ether group, the vinylsilane compound (d) being brought into contact with the catalyst component in a 0.1 to 15-fold molar quantity with respect to the molar quantity (on a titanium atom basis) of the titanium halide compound (b) included in the catalyst component; and bringing the resulting product into contact with an organoaluminum compound (B) and an external electron donor compound (C) in the presence of an inert organic solvent (Y).

(7) A method for producing an olefin polymer including bringing an organoaluminum compound (B) and an external electron donor compound (C) into contact with the solid catalyst component for olefin polymerization according to any one of (1) to (5) in the presence of an inert organic solvent (Y), and polymerizing an olefin.

(8) The method for producing an olefin polymer according to (7), wherein the inert organic solvent (Y) is one or more compounds selected from a saturated chain-like hydrocarbon and an alicyclic hydrocarbon.

(9) A method for producing an olefin polymer including bringing the solid catalyst component for olefin polymerization according to any one of (1) to (5) into contact with an organoaluminum compound (B) and an external electron donor compound (C) in the presence of a gaseous olefin.

Several aspects of the invention preferably provide the following.

(1)' A solid catalyst component for olefin polymerization that is produced by bringing a vinylsilane compound (d) into contact with a catalyst component, the catalyst component being a powdery solid component obtained by bringing a magnesium compound (a), a titanium halide compound (b), and an electron donor compound (c) into contact with each other, the electron donor compound (c) being one or more compounds that do not include a phthalic acid ester structure, and include one or more groups selected from an ester group, a carbonate group, and an ether group, the vinylsilane compound (d) being brought into contact with the catalyst component in a 0.1 to 15-fold molar quantity with respect to the molar quantity (on a titanium atom basis) of the titanium halide compound (b) included in the catalyst component.

(2)' The solid catalyst component for olefin polymerization according to (1)', wherein the electron donor compound (c) is at least one compound selected from a succinic acid ester, a maleic acid ester, a cyclohexenecarboxylic acid ester, an ether carboxylic acid ester, a dicarbonate, and an ether carbonate.

(3)' The solid catalyst component for olefin polymerization according to (1)', wherein the vinylsilane compound (d) is a compound represented by the following general formula (I), $$(CH_2\!\!=\!\!CH\!-\!)_p SiR^1_q X_{4-p-q} \qquad (I)$$

wherein $R^1$ is a hydrogen atom or a hydrocarbon residue having 1 to 20 carbon atoms, X is a halogen atom, p is a number from 1 to 4, q is a number that satisfies $p+q\leq 4$, provided that a plurality of $R^1$ are either identical to or different from each other when a plurality of $R^1$ are present, and a plurality of X are either identical to or different from each other when a plurality of X are present.

(4)' The solid catalyst component for olefin polymerization according to (1)', wherein the vinylsilane compound (d) is a compound represented by the following general formula (II), $$(CH_2\!\!=\!\!CH\!-\!)SiR^2 R^3 R^4 \qquad (II)$$

wherein $R^2$, $R^3$, and $R^4$ are independently a hydrogen atom, or a group selected from a group derived from a saturated hydrocarbon compound having 1 to 10 carbon atoms, a group derived from a halogen-containing saturated hydrocarbon compound having 1 to 10 carbon atoms, a group derived from an aromatic hydrocarbon compound having 6 to 20 carbon atoms, and a group derived from a halogen-containing aromatic hydrocarbon compound having 6 to 20 carbon atoms, provided that $R^2$, $R^3$, and $R^4$ are either identical to or different from each other.

(5)' The solid catalyst component for olefin polymerization according to (1)', the solid catalyst component being produced by bringing the vinylsilane compound (d) into contact with the catalyst component at a temperature of 0 to 80° C. for 1 minute or more in the absence of an organoaluminum compound (B) and an external electron donor compound (C).

(6)' A method for producing an olefin polymerization catalyst including bringing a vinylsilane compound (d) into contact with a catalyst component in the absence of an organoaluminum compound and an external electron donor compound, the catalyst component being a powdery catalyst component obtained by bringing a magnesium compound (a), a titanium halide compound (b), and an electron donor compound (c) into contact with each other, the electron donor compound (c) being one or more compounds that do not include a phthalic acid ester structure, and include one or more groups selected from an ester group, a carbonate group, and an ether group, the vinylsilane compound (d) being brought into contact with the catalyst component in a 0.1 to 15-fold molar quantity with respect to the molar quantity (on a titanium atom basis) of the titanium halide compound (b) included in the catalyst component; and bringing the resulting product into contact with an organoaluminum compound (B) and an external electron donor compound (C) in the presence of an inert organic solvent (Y).

(7)' A method for producing an olefin polymer including bringing an organoaluminum compound (B) and an external electron donor compound (C) into contact with the solid catalyst component for olefin polymerization according to any one of (1)' to (5)' in the presence of an inert, organic solvent (Y), and polymerizing an olefin.

(8)' The method for producing an olefin polymer according to (7)', wherein the inert organic solvent (Y) is one or more compounds selected from a saturated chain-like hydrocarbon and an alicyclic hydrocarbon.

(9)' A method for producing an olefin polymer including bringing the solid catalyst component for olefin polymerization according to any one of (1)' to (5)' into contact with an organoaluminum compound (B) and an external electron donor compound (C) in the presence of a gaseous olefin.

Advantageous Effects of Invention

Since the solid catalyst component for olefin polymerization according to one aspect of the invention is produced by bringing a small amount of liquid vinylsilane compound (d) into contact with the powdery catalyst component, the vinylsilane compound (d) does not poison the titanium active sites included in the solid catalyst component, and the stability of the titanium active sites is improved.

Therefore, when a polymerization catalyst that includes the solid catalyst component (A) that includes an electron donor compound other than a phthalic acid ester, the organoaluminum compound (B), and the external electron donor compound (C) is produced in an inert gas atmosphere, it is possible to suppress a situation in which the organoaluminum compound (B) reacts with the titanium active sites to large extent, and achieve high polymerization activity while ensuring that the resulting polymer exhibits high stereoregularity.

Since the solid catalyst component for olefin polymerization according to one aspect of the invention is produced by bringing a small amount of liquid vinylsilane compound (d) into contact with the powdery catalyst component, it is unnecessary to perform drying under reduced pressure when producing the solid catalyst component or the polymerization catalyst, and it is possible to suppress a situation in which the vinylsilane compound (d) disappears. Therefore, it is possible to effectively achieve the above advantageous effect.

The aspects of the invention can thus provide a solid catalyst component for olefin polymerization that exhibits excellent catalytic activity during polymerization, and can produce a polymer that exhibits excellent stereoregularity, bulk density, and the like, even when a polymerization catalyst is produced in an inert atmosphere, when the solid catalyst component includes an electron donor compound other than a phthalic acid ester, and an organosilicon compound, a method for producing an olefin polymerization catalyst, and a method that easily and inexpensively produces an olefin polymer using the solid catalyst component for olefin polymerization.

BRIEF DESCRIPTION OF DRAWINGS

FIG. 1 is a view illustrating an example of a process that produces a polymerization catalyst.

DESCRIPTION OF EMBODIMENTS

A solid catalyst component for olefin polymerization (hereinafter may be appropriately referred to as "solid catalyst component (A)") according to one embodiment of the invention is described below.

The solid catalyst component (A) according to one embodiment of the invention is produced by bringing a vinylsilane compound (d) into contact with a catalyst component, the catalyst component being a powdery solid component obtained by bringing a magnesium compound (a), a titanium halide compound (b), and an electron donor compound (c) into contact with each other, the electron donor compound (c) being one or more compounds that do not include a phthalic acid ester structure, and include one or more groups selected from an ester group, a carbonate group, and an ether group, the vinylsilane compound (d) being brought into contact with the catalyst component in a 0.1 to 15-fold molar quantity with respect to the molar quantity (on a titanium atom basis) of the titanium halide compound (b) included in the catalyst component.

The magnesium compound (a) that is used to produce the solid catalyst component (A) according to one embodiment of the invention may be one or more compounds selected from a magnesium dihalide, a dialkylmagnesium, an alkylmagnesium halide, a dialkoxymagnesium, a diaryloxymagnesium, an alkoxymagnesium halide, a fatty acid magnesium salt, and the like.

Among these, a magnesium dihalide, a mixture that includes a magnesium dihalide and a dialkoxymagnesium, and a dialkoxymagnesium (particularly a dialkoxymagnesium) are preferable. Specific examples of the dialkoxymagnesium include dimethoxymagnesium, diethoxymagnesium, dipropoxymagnesium, dibutoxymagnesium, ethoxymethoxymagnesium, ethoxypropoxymagnesium, butoxyethoxymagnesium, and the like. It is particularly preferable to use diethoxymagnesium.

The dialkoxymagnesium may be produced by reacting magnesium metal with an alcohol in the presence of a halogen-containing organic metal compound or the like. The dialkoxymagnesium may be in the form of granules or a powder, and may have an indefinite shape or a spherical shape. For example, when a spherical dialkoxymagnesium is used, a polymer powder that has a better particle shape and a narrow particle size distribution is easily obtained. Therefore, it is possible to improve the handling capability of the polymer powder during polymerization, and easily eliminate a problem (e.g., a situation in which a filter provided to a polymer separator is clogged by a fine polymer powder).

These dialkoxymagnesiums may be used either alone or in combination.

The spherical dialkoxymagnesium need not necessarily have a perfectly spherical shape, but may have an elliptical shape or a potato-like shape. It is preferable that the spherical dialkoxymagnesium have a ratio (L/W) of the major axis (L) to the minor axis (W) of 3 or less, more preferably 1 to 2, and still more preferably 1 to 1.5.

It is preferable that the dialkoxymagnesium have an average particle size of 1 to 200 μm, and more preferably 5 to 150 μm.

When the dialkoxymagnesium has a spherical shape, it is preferable that the dialkoxymagnesium have an average particle size of 1 to 100 μm, more preferably 5 to 80 μm, and still more preferably 10 to 60 μm.

It is preferable that the dialkoxymagnesium have a low fine powder (particle) content and a low coarse powder (particle) content, and have a narrow particle size distribution.

More specifically, it is preferable that the dialkoxymagnesium have a particle size distribution in which the content of particles having a particle size of 5 μm or less is 20% or less, and more preferably 10% or less. It is preferable that the dialkoxymagnesium have a particle size distribution in which the content of particles having a particle size of 100 μm or more is 10% or less, and more preferably 5% or less.

The particle size distribution "D90/D10" (where, D90 is the particle size at 90% in the cumulative particle size distribution, and D10 is the particle size at 10% in the cumulative particle size distribution) of the dialkoxymagnesium is preferably 3 or less, and more preferably 2 or less.

The spherical dialkoxymagnesium described above may be produced using the method disclosed in JP-A-58-4132, JP-A-62-51633, JP-A-3-74341, JP-A-4-368391, JP-A-8-73388, or the like.

The titanium halide compound (b) that is used to produce the solid catalyst component (A) according to one embodiment of the invention is not particularly limited, but may be one or more compounds selected from a titanium tetrahalide, an alkoxytitanium halide, and the like.

The titanium halide compound (b) is preferably a compound selected from a titanium tetrahalide and an alkoxytitanium halide represented by $Ti(OR^2)_iX_{4-i}$ (wherein $R^2$ is an alkyl group having 1 to 4 carbon atoms, X is a halogen atom, and i is an integer from 0 to 4).

Specific examples of the titanium halide compound (b) include a titanium tetrahalide such as titanium tetrachloride, titanium tetrabromide, and titanium tetraiodide, and an alkoxytitanium halide such as methoxytitanium trichloride, ethoxytitanium trichloride, propoxytitanium trichloride, n-butoxytitanium trichloride, dimethoxytitanium dichloride, diethoxytitanium dichloride, dipropoxytitanium dichloride, di-n-butoxytitanium dichloride, trimethoxytitanium chloride, triethoxytitanium chloride, tripropoxytitanium chloride, and tri-n-butoxytitanium chloride.

The titanium halide compound (b) is preferably a titanium tetrahalide, and more preferably titanium tetrachloride.

The electron donor compound (c) that is used to produce the solid catalyst component (A) according to one embodiment of the invention is a compound that does not include a phthalic acid ester structure, and includes one or more groups selected from an ester group, a carbonate group, and an ether group.

The electron donor compound (c) is preferably an organic compound that does not include a phthalic acid ester structure, and includes one or more groups selected from an ester group, a carbonate group, and an ether group.

When the electron donor compound (c) includes an ester group, the electron donor compound (c) is preferably a compound that includes 1 to 3 ester residues. Examples of the electron donor compound (c) that includes an ester group include a monocarboxylic acid ester that includes one ester residue, a dicarboxylic acid diester that includes two ester residues, a polycarboxylic acid polyester that includes three or more ester residues, an ether-carboxylic acid ester that includes one ester residue and one alkoxy group, a diol ester, a polyol ester, a substituted phenylene aromatic diester, and the like.

Among these, a monocarboxylic acid ester such as an acetic acid ester, a propionic acid ester, a benzoic acid ester, a p-toluic acid ester, and an anisic acid ester, a dicarboxylic acid diester such as a maleic acid diester, a 2,3-dialkylsuccinic acid diester, a benzylidenemalonic acid diester, a cyclohexane-1,2-dicarboxylic acid diester, a 1-cyclohexene-1,2-dicarboxylic acid diester, a 4-methylcyclohexane-1,2-dicarboxylic acid diester, a 3-methylcyclohexane-1,2-dicarboxylic acid diester, a 3,6-diphenylcyclohexane-1,2-dicarboxylic acid diester, and a 3-methyl-6-n-propylcyclohexane-1,2-dicarboxylic acid diester, an ether-carboxylic acid ester such as ethyl 3-ethoxy-2-isopropylpropionate, ethyl 3-ethoxy-2-isobutylpropionate, ethyl 3-ethoxy-2-t-butylpropionate, ethyl 3-ethoxy-2-t-pentylpropionate, ethyl 3-ethoxy-2-t-cyclohexylpropionate, and ethyl 3-ethoxy-2-cyclopentylpropionate, and a diol ester such as 2,4-pentanediol dibenzoate, 3-methyl-2,4-pentanediol dibenzoate, 3-methyl-5-t-butyl-1,2-phenylene dibenzoate, and 3,5-diisopropyl-1,2-phenylene dibenzoate are preferable. The electron donor compound (c) that includes an ester group is particularly preferably one or more compounds selected from diethyl maleate, diethyl benzylidenemalonate, diethyl 2,3-diisopropylsuccinate, diethyl cyclohexane-1,2-dicarboxylate, di-n-propyl cyclohexane-1,2-dicarboxylate, di-n-butyl cyclohexane-1,2-dicarboxylate, ethyl 3-ethoxy-2-isopropylpropionate, ethyl 3-ethoxy-2-t-butylpropionate, ethyl 3-ethoxy-2-t-pentylpropionate, 2,4-pentanediol dibenzoate, 3-methyl-2,4-pentanediol dibenzoate, 3-methyl-5-t-butyl-1,2-phenylene dibenzoate, 3,5-diisopropyl-1,2-phenylene dibenzoate, and the like.

When the electron donor compound (c) includes an ether group, the electron donor compound (c) is preferably a compound that includes one ether group, a compound that includes a fluorene structure, or a compound that includes a diether structure, and includes one or two alkyl groups or cycloalkyl groups having 3 to 7 carbon atoms. The electron donor compound (c) that includes an ether group may be or more compounds selected from monoether such as methyl ether, ethyl ether, propyl ether, butyl ether, and amyl ether, and a diether such as diphenyl ether, 2,2-dialkyl-1,3-dialkoxypropane, 2,2-dicycloalkyl-1,3-dimethoxypropane, and 9,9-bis(methoxymethyl)fluorene.

The electron donor compound (c) that includes an ether group is particularly preferably 2-isopropyl-2-isobutyl-1,3-dimethoxypropane, 2-isopropyl-2-isopentyl-1,3-dimethoxypropane, or 9,9-bis(methoxymethyl)fluorene.

When the electron donor compound (c) includes a carbonate group, the electron donor compound (c) is preferably a compound that includes 1 to 3 carbonate groups. Examples of the electron donor compound (c) that includes a carbonate group include a carbonate ether that includes one carbonate group and one alkoxy group, a carbonate ester that includes one carbonate group and one ester residue, a compound that includes one carbonate group and one carboxy group, a dicarbonate that includes two carbonate groups, a polycarbonate that includes three or more carbonate groups, and the like. The electron donor compound (c) that includes a carbonate group is preferably a carbonate ether, a carbonate ester, or a dicarbonate, and particularly preferably 2-ethoxyethyl methyl carbonate, 2-propoxyethyl methyl carbonate, 2-benzyloxyethyl phenyl carbonate, or 5-t-butyl-1,2-phenylenediphenyl dicarbonate.

The electron donor compound (c) is preferably at least one compound selected from a succinic acid ester, a maleic acid ester, a cyclohexenecarboxylic acid ester, an ether carboxylic acid ester, a dicarbonate, and an ether carbonate.

The catalyst component included in the solid catalyst component (A) according to one embodiment of the invention includes the electron donor compound (c) other than a phthalic acid ester (i.e., does not include a phthalic acid ester structure). Since the solid catalyst component (A) according to one embodiment of the invention includes the vinylsilane compound (d) in a specific molar quantity with respect to the molar quantity (on a titanium atom basis) of the titanium halide compound (b) included in the catalyst component (as described later), the solid catalyst component (A) according to one embodiment of the invention exhibits excellent catalytic activity during polymerization, and can produce a polymer that exhibits excellent stereoregularity, bulk density, and the like.

The catalyst component that is included in the solid catalyst component (A) according to one embodiment of the invention is obtained by bringing the magnesium compound (a), the titanium halide compound (b), and the electron donor compound (c) (i.e., one or more compounds that do not include a phthalic acid ester structure, and include one or more groups selected from an ester group, a carbonate group, and an ether group) into contact with each other.

The catalyst component may be a catalyst component obtained by bringing the magnesium compound (a), the titanium halide compound (b), the electron donor compound (c), and a polysiloxane into contact with each other.

It is possible to easily improve the stereoregularity or the crystallinity of the resulting polymer, and easily reduce the fine powder content in the resulting polymer, by bringing the magnesium compound (a), the titanium halide compound (b), the electron donor compound (c), and a polysiloxane into contact with each other.

A polysiloxane is a polymer that includes a siloxane bond (—Si—O bond) in the main chain, and may be referred to as "silicone oil". The polysiloxane may be a chain-like, partially hydrogenated, cyclic, or modified polysiloxane that is liquid or viscous at room temperature, and has a viscosity at 25° C. of 0.02 to 100 cm$^2$/s (2 to 1,000 cSt).

Examples of the chain-like polysiloxane include dimethylpolysiloxane and methylphenylpolysiloxane. Examples of the partially hydrogenated polysiloxane include methyl hydrogen polysiloxane having a hydrogenation rate of 10 to 80%. Examples of the cyclic polysiloxane include hexamethylcyclotrisiloxane, octamethylcyclotetrasiloxane, decamethylcyclopentansiloxane, 2,4,6-trimethylcyclotrisiloxane, and 2,4,6,8-tetramethylcyclotetrasiloxane. Examples of the modified polysiloxane include a higher fatty acid group-substituted dimethylsiloxane, an epoxy group-substituted dimethylsiloxane, and a polyoxyalkylene group-substituted dimethylsiloxane. Among these, decamethylcyclopentasiloxane and dimethylpolysiloxane are preferable, and decamethylcyclopentasiloxane is particularly preferable.

The catalyst component is preferably a catalyst component that is produced by bringing the magnesium compound (a), the titanium halide compound (b), the electron donor compound (c), and an optional polysiloxane into contact with each other in the presence of an inert organic solvent.

The inert organic solvent is preferably an inert organic solvent that dissolves the titanium halide compound (b), but does not dissolve the magnesium compound (a). The inert organic solvent may be one or more compounds selected from a saturated hydrocarbon compound such as pentane, hexane, heptane, octane, nonane, decane, cyclohexane, methylcyclohexane, ethylcyclohexane, 1,2-diethylcyclohexane, methylcyclohexene, decalin, and mineral oil, an aromatic hydrocarbon compound such as benzene, toluene, xylene, and ethylbenzene, a halogenated hydrocarbon compound such as o-dichlorobenzene, methylene chloride, 1,2-dichlorobenzene, carbon tetrachloride, and dichloroethane, and the like.

The inert organic solvent is preferably a saturated hydrocarbon compound or an aromatic hydrocarbon compound that has a boiling point of about 50 to 200° C. and is liquid at room temperature. More specifically, the inert organic solvent is preferably one or more compounds selected from hexane, heptane, octane, ethylcyclohexane, mineral oil, toluene, xylene, and ethylbenzene.

The catalyst component may be produced by suspending the magnesium compound (a) and the electron donor compound (c) in an inert organic solvent an aromatic hydrocarbon compound having a boiling point of 50 to 150° C.) to prepare a suspension, and bringing a mixed solution that includes the titanium halide compound (b) and an inert organic solvent (e.g., aromatic hydrocarbon compound) into contact with the suspension to effect a reaction.

The catalyst component may also be produced by suspending the magnesium compound (a) in the titanium halide compound (b) or an inert organic solvent (e.g., aromatic hydrocarbon compound) to prepare a suspension, and bringing the electron donor compound (c) and the titanium halide compound (b) (optional) into contact with the suspension to effect a reaction.

When a spherical magnesium compound is used as the magnesium compound (a), it is possible to obtain a spherical catalyst component having a sharp particle size distribution, and obtain a spherical solid catalyst component (A) having a sharp particle size distribution. It is also possible to obtain a spherical catalyst component having a sharp particle size distribution without using a spherical magnesium compound (a), by forming particles using a spray drying method that spray-dries a solution or a suspension using a sprayer, for example.

The magnesium compound (a), the titanium halide compound (b), the electron donor compound (c), an optional polysiloxane, and the like may be brought into contact with each other in an inert gas atmosphere.

More specifically, the magnesium compound (a), the titanium halide compound (b), the electron donor compound (c), an optional polysiloxane, and the like may be brought into contact with each other in an inert gas atmosphere in a state in which water and the like have been removed while stirring the components in a vessel equipped with a stirrer.

When merely bringing the components into contact with each other, and stirring (mixing) the mixture, or dispersing or suspending the components to effect modification, the components may be brought into contact with each other at a relatively low temperature around room temperature. When bringing the components into contact with each other, and reacting the mixture to obtain a product, it is preferable to bring the components into contact with each other at 40 to 130° C. In this case, it is preferable to react the mixture at the same temperature.

If the temperature is lower than 40° C., the reaction may not proceed sufficiently, and the resulting solid catalyst component may not exhibit sufficient performance. If the temperature exceeds 130° C., it may be difficult to control the reaction due to significant vaporization of the solvent, for example.

The reaction time is preferably 1 minute or more, more preferably 10 minutes or more, and still more preferably 30 minutes or more.

The ratio of each component used to produce the catalyst component differs depending on the production method, and may be appropriately determined.

The titanium halide compound (b) is preferably used in an amount of 0.5 to 100 mol, more preferably 0.5 to 10 mol, and still more preferably 1 to 5 mol, based on 1 mol of the magnesium compound (a).

The electron donor compound (c) is preferably used in an amount of 0.01 to 10 mol, more preferably 0.01 to 1 mol, and still more preferably 0.02 to 0.6 mol, based on 1 mol of the magnesium compound (a).

The polysiloxane (optional component) is preferably used in an amount of 0.01 to 100 g, more preferably 0.05 to 80 g, and still more preferably 1 to 50 g, based on 1 mol of the magnesium compound (a).

The inert organic solvent (e.g., aromatic hydrocarbon compound) is preferably used in an amount of 0.001 to 500 mol, more preferably 0.001 to 70 mol, and still more preferably 0.005 to 50 mol, based on 1 mol of the magnesium compound (a).

The solid catalyst component (A) according to one embodiment of the invention is produced by bringing the vinylsilane compound (d) into contact with the catalyst component.

Examples of the vinylsilane compound (d) include a compound represented by the following general formula (I).

$$(CH_2=CH-)_p SiR^1_q X_{4-p-q} \qquad (I)$$

wherein $R^1$ is a hydrogen atom or a hydrocarbon residue having 1 to 20 carbon atoms, X is a halogen atom, p is a number from 1 to 4, q is a number that satisfies $p+q \leq 4$, provided that a plurality of $R^1$ are either identical to or different from each other when a plurality of $R^1$ are present, and a plurality of X are either identical to or different from each other when a plurality of X are present.

$R^1$ in the compound represented by the general formula (I) is a hydrogen atom or a hydrocarbon residue having 1 to 20 carbon atoms. When $R^1$ is a hydrocarbon group, $R^1$ is preferably a hydrocarbon group having 1 to 10 carbon atoms, and more preferably a hydrocarbon group having 1 to 5 carbon atoms.

X in the compound represented by the general formula (I) is a halogen atom. Specific examples of the halogen atom include a chlorine atom and the like.

p in the compound represented by the general formula (I) is a number from 1 to 4, preferably a number from 1 to 3, and more preferably a number from 1 to 2.

q in the compound represented by the general formula (I) is a number that satisfies $p+q \leq 4$.

A plurality of $R^1$ are either identical to or different from each other when a plurality of $R^1$ are present, and a plurality of X are either identical to or different from each other when a plurality of X are present.

Further examples of the vinylsilane compound (d) include a compound represented by the following general formula (II).

$$(CH_2=CH-)SiR^2R^3R^4 \qquad (II)$$

wherein $R^2$, $R^3$, and $R^4$ are independently a hydrogen atom, or a group selected from a group derived from a saturated hydrocarbon compound having 1 to 10 carbon atoms, a group derived from a halogen-containing saturated hydrocarbon compound having 1 to 10 carbon atoms, a group derived from an aromatic hydrocarbon compound having 6 to 20 carbon atoms, and a group derived from a halogen-containing aromatic hydrocarbon compound having 6 to 20 carbon atoms, provided that $R^2$, $R^3$, and $R^4$ are identical to or different from other.

$R^2$, $R^3$, and $R^4$ in the compound represented by the general formula (II) are independently a hydrogen atom, or a group selected from a group derived from a saturated hydrocarbon compound having 1 to 10 carbon atoms, a group derived from a halogen-containing saturated hydrocarbon compound having 1 to 10 carbon atoms, a group derived from an aromatic hydrocarbon compound having 6 to 20 carbon atoms, and a group derived from a halogen-containing aromatic hydrocarbon compound having 6 to 20 carbon atoms.

When $R^2$, $R^3$, and $R^4$ in the compound represented by the general formula (II) are a group derived from a saturated hydrocarbon compound having 1 to 10 carbon atoms, $R^2$, $R^3$, and $R^4$ are preferably a group derived from a saturated hydrocarbon compound having 1 to 5 carbon atoms, and more preferably a group derived from a saturated hydrocarbon compound having 1 to 2 carbon atoms.

When $R^2$, $R^3$, and $R^4$ in the compound represented by the general formula (II) are a group derived from a halogen-containing saturated hydrocarbon compound having 1 to 10 carbon atoms, $R^2$, $R^3$, and $R^4$ are preferably a group derived from a halogen-containing saturated hydrocarbon compound having 1 to 5 carbon atoms, and more preferably a group derived from a halogen-containing saturated hydrocarbon compound having 1 to 2 carbon atoms.

When $R^2$, $R^3$, and $R^4$ in the compound represented by the general formula (II) are a group derived from an aromatic hydrocarbon compound having 6 to 20 carbon atoms, $R^2$, $R^3$, and $R^4$ are preferably a group derived from an aromatic hydrocarbon compound having 6 to 10 carbon atoms, and more preferably a group derived from an aromatic hydrocarbon compound having 6 to 7 carbon atoms.

When $R^2$, $R^3$, and $R^4$ in the compound represented by the general formula (II) are a group derived from a halogen-containing aromatic hydrocarbon compound having 6 to 20 carbon atoms, $R^2$, $R^3$, and $R^4$ are preferably a group derived from a halogen-containing aromatic hydrocarbon compound having 6 to 10 carbon atoms, and more preferably a group derived from a halogen-containing aromatic hydrocarbon compound having 6 to 7 carbon atoms.

$R^2$, $R^3$, and $R^4$ in the compound represented by the general formula (II) are either identical to or different from each other.

The vinylsilane compound (d) may be one or more compounds selected from vinylsilane, vinylmethylsilane, vinyldimethylsilane, vinyltrimethylsilane, vinyltrichlorosilane, vinylmethylchlorosilane, vinyldiethylchlorosilane, vinyltriethylsilane, vinyldiethylmethylsilane, vinyldimethylphenylsilane, vinylbenzyldimethylsilane, vinyldimethylchlorosilane, divinyldimethylsilane, divinyldiethylsilane, divinyldichlorosilane, trivinylmethylsilane, and the like.

The vinylsilane compound (d) is preferably one or more compounds selected from vinylsilane, vinyltrimethylsilane, vinyltriethylsilane, divinyldimethylsilane, divinyldichlorosilane, divinyldiethylsilane, trivinylmethylsilane, and vinyltrichlorosilane, and particularly preferably one or more compounds selected from vinylsilane, vinyltrimethylsilane, vinyltriethylsilane, and vinyltrichlorosilane.

The solid catalyst component (A) according to one embodiment of the invention is produced by bringing the vinylsilane compound (d) into contact with the catalyst component in a 0.1 to 15-fold molar quantity, preferably a 0.5 to 15-fold molar quantity, and more preferably a 1 to 15-fold molar quantity, with respect to the molar quantity (on a titanium atom basis) of the titanium halide compound (b) included in the catalyst component.

The solid catalyst component (A) according to one embodiment of the invention is produced by bringing the vinylsilane compound (d) into contact with the catalyst component so that the vinylsilane compound (d) is dispersed on the surface of the catalyst component, or dispersed inside the catalyst component.

When the vinylsilane compound (d) is brought into contact with the catalyst component in a molar quantity within the above range, it is possible to produce a polymer having high stereoregularity while achieving high activity by polymerizing a monomer using the resulting polymerization catalyst in the same manner as in the case where a phthalic acid ester is used as the electron donor compound, although the solid catalyst component (A) includes an electron donor compound other than a phthalic acid ester.

The titanium atom content and the magnesium atom content in the catalyst component refer to values measured in accordance with the method (oxidation-reduction titration) specified in JIS 8311-1997 ("Method for determination of titanium in titanium ores").

Since the solid catalyst component (A) according to one embodiment of the invention is produced by bringing the vinylsilane compound (d) into contact with the catalyst component in a molar quantity within the above range, it is unnecessary to perform a drying process under reduced pressure when producing the polymerization catalyst. This makes it possible to ensure that the resulting polymerization catalyst exhibits excellent catalytic activity, and effectively produce a polymer that exhibits excellent stereoregularity, bulk density, and the like.

The titanium atom content, the magnesium atom content, the halogen atom content, and the content of the electron donor compound in the solid catalyst component (A) according to one embodiment of the invention are not particularly limited as long as the advantageous effects of the invention can be achieved.

The titanium atom content in the solid catalyst component (A) according to one embodiment of the invention is preferably 1.0 to 10 mass %, more preferably 1.5 to 8 mass %, and still more preferably 1.5 to 5 mass %.

The magnesium atom content in the solid catalyst component (A) according to one embodiment of the invention is preferably 10 to 70 mass %, more preferably 10 to 50 mass %, still more preferably 15 to 40 mass %, and yet more preferably 15 to 25 mass %.

The halogen atom content in the solid catalyst component (A) according to one embodiment of the invention is preferably 20 to 90 mass %, more preferably 30 to 85 mass %, still more preferably 40 to 80 mass %, and yet more preferably 45 to 80 mass %.

The total content of the electron donor compound (c) in the solid catalyst component (A) according to one embodiment of the invention is preferably 0.5 to 30 mass %, more preferably 1 to 25 mass %, and still more preferably 2 to 20 mass %.

The halogen atom content in the solid catalyst component (A) according to one embodiment of the invention refers to a value obtained by treating the solid catalyst component using a mixture that includes sulfuric acid and purified water to obtain an aqueous solution, preparatively isolating a given amount of the aqueous solution, and titrating halogen atoms with a silver nitrate standard solution (silver nitrate titration method). The content of the electron donor compound in the solid catalyst component (A) according to one embodiment of the invention refers to a value obtained by hydrolyzing the solid catalyst, extracting the internal electron donor using an aromatic solvent, and subjecting the solution to gas chromatography using a flame ionization detector (FID).

The solid catalyst component (A) according to one embodiment of the invention may be produced by bringing the vinylsilane compound (d) into contact with the catalyst component using a rotary mixer such as a V-type mixer, a stirring mixer such as a tank or a reactor equipped with a stirrer, or a mixer-grinder such as a vibrating mill or a ball mill, for example.

It is preferable to use a rotary mixer since breakage of the particles of the solid catalyst component can be prevented.

When a solid catalyst component is produced from a catalyst component, a vinylsilane compound is normally brought into contact with the catalyst component in the presence of an inert organic solvent, followed by washing and drying to produce a solid catalyst component.

However, the inventors found that the content of the vinylsilane compound in the solid catalyst component decreases due to washing and drying.

On the other hand, it is possible to obtain the solid catalyst component (A) that appropriately includes the vinylsilane compound (d) by bringing the vinylsilane compound (d) into contact with the catalyst component, and mixing the mixture in a dry state using a mixer-grinder or the like (see above).

The vinylsilane compound (d) may be brought into contact with the catalyst component at an arbitrary temperature. It is preferable to bring the vinylsilane compound (d) into contact with the catalyst component at 0 to 80° C., and more preferably 0 to 50° C.

The vinylsilane compound (d) may be brought into contact with the catalyst component for an arbitrary time. It is preferable to bring the vinylsilane compound (d) into contact with the catalyst component for 1 minute or more, more preferably 1 minute to 10 hours, and still more preferably 5 minutes to 5 hours.

It is preferable to bring the vinylsilane compound (d) into contact with the catalyst component while performing a heat treatment at a temperature equal to or higher than room temperature.

In this case, it is preferable to bring the vinylsilane compound (d) into contact with the catalyst component at 30 to 80° C., and more preferably 30 to 50° C. The heat treatment time is preferably 1 minute or more, more preferably 1 minute to 5 hours, and still more preferably 5 minutes to 3 hours.

The vinylsilane compound (d) can be more uniformly dispersed in the solid catalyst component (A) by bringing the vinylsilane compound (d) into contact with the catalyst component while performing the heat treatment.

The solid catalyst component (A) according to one embodiment of the invention is preferably produced by bringing the vinylsilane compound (d) into contact with the catalyst component in the absence of an organoaluminum compound (B) and an external electron donor compound (C).

A solid catalyst component or a polymerization catalyst may be produced by bringing an organosilicon compound into contact with a catalyst component that includes a magnesium compound and a titanium compound, and bringing an organoaluminum compound into contact with the resulting product to effect a reaction, followed by washing and drying.

However, the inventors found that the content of the vinylsilane compound (d) on the solid catalyst component may decrease due to washing and drying, and it may be difficult to sufficiently suppress an excessive reaction during polymerization due to the organoaluminum compound (B).

It is possible to produce a solid catalyst component while suppressing an excessive reaction with respect to the titanium active sites due to the organoaluminum compound (B), by bringing the vinylsilane compound (d) into contact with the catalyst component in the absence of the organoaluminum compound (B).

It is possible to suppress a situation in which the external electron donor compound (C) poisons the titanium active sites included in the solid catalyst component, and achieve high polymerization activity while ensuring that the resulting polymer exhibits high stereoregularity, by bringing the vinylsilane compound (d) into contact with the catalyst component in the absence of the external electron donor compound (C).

It is particularly preferable to produce the solid catalyst component (A) according to one embodiment of the invention by suspending the magnesium compound (a) in an aromatic hydrocarbon compound having a boiling point of 50 to 150° C., bringing the titanium halide compound (b) into contact with the suspension, and effecting a reaction. In this case, the catalyst component may be produced by bringing one electron donor compound (c), or two or more or more electron donor compounds (c) (e.g., phthalic acid diester) into contact with the suspension at −20 to 130° C. before or after bringing the titanium halide compound (b) into contact with the suspension, optionally bringing a polysiloxane into contact with the mixture, and effecting a reaction. It is preferable to effect an aging reaction at a low temperature before or after bringing one electron donor compound, or two or more or more electron donor compounds, into contact with the suspension.

The solid catalyst component (A) can be produced by washing the resulting product with a hydrocarbon compound (intermediate washing) to obtain a catalyst component, and bringing the vinylsilane compound (d) into contact with the catalyst component.

When an olefin is polymerized using a catalyst that includes the solid catalyst component (A) according to one embodiment of the invention, the vinylsilane compound (d) does not poison the titanium active sites included in the solid catalyst component, and the stability of the titanium active sites is improved.

Therefore, when polymerization is effected while bringing the solid catalyst component (A), the organoaluminum compound (B), and the external electron donor compound (C) into contact with each other in an inert gas atmosphere, it is possible to suppress a situation in which the organoaluminum compound (B) reacts with the titanium active sites to a large extent, and achieve high polymerization activity while ensuring that the resulting polymer exhibits high stereoregularity.

Since the solid catalyst component for olefin polymerization according to one aspect of the invention is produced by bringing a small amount of liquid vinylsilane compound (d) into contact with the powdery catalyst component, it is unnecessary to perform drying under reduced pressure when producing the solid catalyst component or the polymerization catalyst, and it is possible to suppress a situation in which the vinylsilane compound (d) disappears. Therefore, it is possible to effectively achieve the above advantageous effect.

The embodiments of the invention can thus provide a solid catalyst component for olefin polymerization that exhibits excellent catalytic activity during polymerization, and can produce a polymer that exhibits excellent stereoregularity, bulk density, and the like, even when a polymerization catalyst is produced in an inert atmosphere, when the solid catalyst component includes an electron donor compound other than a phthalic acid ester, and an organosilicon compound, and a method that easily and inexpensively produces an olefin polymer using the solid catalyst component for olefin polymerization.

A method for producing an olefin polymerization catalyst according to one embodiment of the invention is described below.

The method for producing an olefin polymerization catalyst according to one embodiment of the invention includes: bringing a vinylsilane compound (d) into contact with a catalyst component in the absence of an organoaluminum compound and an external electron donor compound, the catalyst component being a powdery catalyst component obtained by bringing a magnesium compound (a), a titanium halide compound (b), and an electron donor compound (c) into contact with each other, the electron donor compound (c) being one or more compounds that do not include a phthalic acid ester structure, and include one or more groups selected from an ester group, a carbonate group, and an ether group, the vinylsilane compound (d) being brought into contact with the catalyst component in a 0.1 to 15-fold molar quantity with respect to the molar quantity (on a titanium atom basis) of the titanium halide compound (b) included in the catalyst component; and bringing the resulting product into contact with an organoaluminum compound (B) and an external electron donor compound (C) in the presence of an inert organic solvent (Y).

The method for producing an olefin polymerization catalyst according to one embodiment of the invention includes bringing the solid catalyst component according to one embodiment of the invention into contact with the organoaluminum compound (B) and the external electron donor compound (C) in the presence of the inert organic solvent (Y).

The solid catalyst component according to one embodiment of the invention that is used in connection with the method for producing an olefin polymerization catalyst according to one embodiment of the invention is produced as described in detail above. The solid catalyst component may be brought into contact with the organoaluminum compound (B) and the external electron donor compound (C) in the presence or absence of an olefin (as described later).

A method for producing an olefin polymer according to the embodiments of the invention is described below.

A method for producing an olefin polymer according to one embodiment of the invention includes bringing the organoaluminum compound (B) and the external electron donor compound (C) into contact with the solid catalyst component (A) according to one embodiment of the invention in the presence of the inert organic solvent (Y), and polymerizing an olefin (hereinafter appropriately referred to as "production method 1").

A method for producing an olefin polymer according to another embodiment of the invention includes bringing the organoaluminum compound (B) and the external electron donor compound (C) into contact with the solid catalyst component (A) according to one embodiment of the invention in the presence of a gaseous olefin (hereinafter appropriately referred to as "production method 2").

The production method 1 and the production method 2 include a process that produces the polymerization catalyst, and a process that polymerizes an olefin.

FIG. 1 illustrates the process that produces the polymerization catalyst that is included in the production method 1 and the production method 2.

The organoaluminum compound (B) that is used in connection with the production method 1 and the production method 2 is not particularly limited. Examples of the organoaluminum compound (B) include a compound represented by the following general formula (IV).

$$R^5_p AlQ_{3-t} \quad (IV)$$

wherein $R^5$ is a hydrocarbyl group having 1 to 6 carbon atoms, provided that a plurality of $R^5$ are either identical to or different from each other when a plurality of $R^5$ are present, Q is a hydrogen atom, a hydrocarbyloxy group having 1 to 6 carbon atoms, or a halogen atom, provided that a plurality of Q are either identical to or different from each other when a plurality of Q are present, and t is a neat number that is larger than 0 and equal to or less than 3 ($0 < p \leq 3$).

$R^5$ in the compound represented by the general formula (IV) is preferably an ethyl group or an isobutyl group, Q is preferably a hydrogen atom, a chlorine atom, or a bromine atom, and t is preferably 2 or 3, and particularly preferably 3.

Specific examples of such an organoaluminum compound (B) include triethylaluminum, diethylaluminum chloride, triisobutylaluminum, diethylaluminum bromide, and diethylaluminum hydride. These compounds may be used either alone or in combination. Among these, triethylaluminum and triisobutylaluminum are preferable.

The external electron donor compound (C) that is used in connection with the production method 1 and the production method 2 may be the same as the electron donor compound (C) that is used to produce the catalyst component. The external electron donor compound (C) is preferably one or more compounds selected from a carbonate, an ether, an ester, and an organosilicon compound.

When the external electron donor compound is a carbonate, the carbonate is preferably one or more compounds selected from 2-ethoxyethyl phenyl carbonate, 2-benzyloxyethyl phenyl carbonate, and 2-ethoxyethyl 1-methyl carbonate.

When the external electron donor compound is an ether, the ether is preferably a 1,3-diether, and particularly preferably 9,9-bis(methoxymethyl)fluorene or 2-isopropyl-2-isopentyl-1,3-dimethoxypropane.

When the external electron donor compound is an ester, the ester is preferably methyl benzoate or ethyl benzoate.

Examples of the organosilicon compound include a compound represented by the following general formula (V).

$$R^6_r Si(NR^7R^8)_s(OR^9)_{4-(r+s)} \quad (V)$$

wherein r is an integer from 0 to 4, s is an integer from 0 to 4, provided that r+s is an integer from 0 to 4, $R^7$, and $R^8$ are a hydrogen atom, or a group selected from a linear or branched alkyl group having 1 to 12 carbon atoms, a substituted or unsubstituted cycloalkyl group, a phenyl group, an allyl group, and an aralkyl group, and optionally include a hetero atom, provided that $R^7$ and $R^8$ are optionally bonded to each other to form a ring, and $R^6$, $R^7$, and $R^8$ are either identical to or different from each other, and $R^9$ is a group selected from an alkyl group having 1 to 4 carbon atoms, a cycloalkyl group, a phenyl group, a vinyl group, an allyl group, and an aralkyl group, and optionally includes a hetero atom.

$R^6$ in the compound represented by the general formula (V) is a hydrogen atom, or a group selected from a linear or branched alkyl group having 1 to 12 carbon atoms, a substituted or unsubstituted cycloalkyl group, a phenyl group, an allyl group, and an aralkyl group, and optionally includes a hetero atom.

$R^6$ is preferably a linear or branched alkyl group having 1 to 10 carbon atoms, or a cycloalkyl group having 5 to 8 carbon atoms, and particularly preferably a linear or branched alkyl group having 1 to 8 carbon atoms, or a cycloalkyl group having 5 to 8 carbon atoms.

$R^7$ and $R^8$ in the compound represented by the general formula (V) are a hydrogen atom, or a group selected from a linear or branched alkyl group having 1 to 12 carbon atoms, a substituted or unsubstituted cycloalkyl group, a phenyl group, an allyl group, and an aralkyl group, and optionally include a hetero atom.

$R^7$ and $R^8$ are preferably a linear or branched alkyl group having 1 to 10 carbon atoms, or a cycloalkyl group having 5 to 8 carbon atoms, and particularly preferably a linear or branched alkyl group having 1 to 8 carbon atoms, or a cycloalkyl group having 5 to 8 carbon atoms.

$R^7$ and $R^8$ are optionally bonded to each other to form a ring. In this case, $(NR^7R^8)$ that forms a ring is preferably a perhydroquinolino group or a perhydroisoquinolino group.

$R^6$, $R^7$, and $R^8$ in the compound represented by the general formula (V) are either identical to or different from each other.

$R^9$ in the compound represented by the general formula (V) is a group selected from an alkyl group having 1 to 4 carbon atoms, a cycloalkyl group, a phenyl group, a vinyl group, an allyl group, and an aralkyl group, and optionally includes a hetero atom.

$R^9$ is preferably a linear or branched alkyl group having 1 to 6 carbon atoms, and particularly preferably a linear or branched alkyl group having 1 to 4 carbon atoms.

The organosilicon compound may be one or more compounds selected from a phenylalkoxysilane, an alkylalkoxysilane, a phenylalkylalkoxysilane, a cycloalkylalkoxysilane, a cycloalkylalkylalkoxysilane, an (alkylamino)alkoxysilane, an alkyl(alkylamino)alkoxysilane, an alkyl(alkylamino)silane, an alkylaminosilane, and the like.

The organosilicon compound (B) represented by the general formula (V) in which s is 0 is preferably one or more compounds selected from di-n-propyldimethoxysilane, dilsopropyldimethoxysilane, di-n-butyldimethoxysilane, dilsopropyldimethoxysilane, di-t-butyldimethoxysilane, t,butylmethyldimethoxysilane, t-butylethyldimethoxysilane, di-n-butyldiethoxysilane, t-butyltrimethoxysilane, t-butyltriethoxysilane, dicyclohexyldimethoxysilane, dicyclohexyldiethoxysilane, cyclohexylmethyldimethoxysilane, cyclohexylmethyldiethoxysilane, cyclohexylethyldimethoxysilane, cyclohexylethyldiethoxysilane, dicyclopentyldimethoxysilane, dicyclopentyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane, 3,5-dimethylcyclohexylcyclopentyldimethoxysilane, and the like.

The organosilicon compound represented by the general formula (V) in which s is an integer from 1 to 4, may be one or more compounds selected from an (alkylamino)trialkylsilane, an (alkylamino)dialkylcycloalkylsilane, an (alkylamino)alkyldicycloalkylsilane, an (alkylamino)tricycloalkylsilane, an (alkylamino)(dialkylamino)dialkylsilane, an (alkylamino)(dialkylamino)dicycloalkylsilane, a bis(alkylamino)dialkylsilane, a bis(alkylamino)alkylcycloalkylsilane, a bis(alkylamino)dicycloalkylsilane, a bis(alkylamino)(dialkylamino)alkylsilane, a bis(alkylamino)(dialkylamino)cycloalkylsilane, a di(alkylamino)dialkylsilane, a di(alkylamino)alkylcycloalkylsilane, a di(alkylamino)dicycloalkylsilane, a di(cycloalkylamino)dialkylsilane, a di(cycloalkylamino)alkylcycloalkylsilane, a di(cycloalkylamino)dicycloalkylsilane, a tris(alkylamino)alkylsilane, a tris(alkylamino)cycloallcylsilane, a tri(alkylamino)alkylsilane, a tris(alkylamino)(dialkylamino)silane, a tri(alkylamino)cycloalkylsilane, a tri(cycloalkylamino)alkylsilane, a tri(cycloalkylamino)cycloalkylsilane, a tetrakis(alkylamino)silane, a tris(alkylamino)dialkylaminosilane, a tris(cycloalkylamino)dialkylaminosilane, a bis(dialkylamino)bis(alkylamino)silane, a dialkylaminotris(alkylamino)silane, a bis(perhydroisoquinolino)bis(alkylamino)silane, a bis(perhydroquinolino)bis(alkylamino)silane, a bis(cycloalkylamino)bis(alkylamino)silane, a tetra(alkylamino)silane, a tris(alkylamino)dialkylaminosilane, a tris(cycloalkylamino)dialkylaminosilane, a di(dialkylamino)di(alkylamino)silane, a dialkylaminotri(alkylamino)silane, a di(alkyl-substituted perhydroisoquinolino)di(alkylamino)silane, a di(alkyl-substituted perhydroquinolino)di(alkylamino)silane, a di(cycloalkylamino)di(alkylamino)silane, an alkyl(dialkylamino)(alkylamino)alkoxysilane, a cycloalkyl(dialkylamino)(alkylamino)alkoxysilane, a vinyl(dialkylamino)(alkylamino)alkoxysilane, an allyl(dialkylamino)(alkylamino)alkoxysilane, an aralkyl(dialkylamino)(alkylamino)alkoxysilane, a dialkyl(alkylamino)alkoxysilane, and the like.

The organosilicon compound represented by the general formula (V) in which s is an integer from 1 to 4, is preferably one or more compounds selected from ethyl(t-butylamino)dimethoxysilane, cyclohexyl(cyclohexylamino)dimethoxysilane, ethyl(t-butylamino)dimethoxysilane, bis(cyclohexylamino)dimethoxysilane, bis(perhydroisoquinolino)dimethoxysilane, bis(perhydroquinolino)dimethoxysilane, ethyl(isoquinolino)dimethoxysilane, diethylaminotrimethoxysilane, diethylaminotriethoxysilane, and the like, and particularly preferably bis(perhydroisoquinolino)dimethoxysilane, diethylaminotrimethoxysilane, or diethylaminotriethoxysilane.

These external electron donor compounds (C) may be used in combination.

The production method 1 includes polymerizing an olefin after bringing the organoaluminum compound (B) and the external electron donor compound (C) into contact with the solid catalyst component (A) according to one embodiment of the invention in the presence of the inert organic solvent (Y).

The inert organic solvent (Y) may be one or more compounds selected from a saturated chain-like hydrocarbon and an alicyclic hydrocarbon.

More specifically, the inert organic solvent (Y) may be one or more compounds selected from a saturated hydrocarbon compound such as pentane, hexane, heptane, octane, nonane, decane, cyclohexane, methylcyclohexane, ethylcyclohexane, 1,2-diethylcyclohexane, methylcyclohexene, decalin, and mineral oil, an aromatic hydrocarbon compound such as benzene, toluene, xylene, and ethylbenzene, a halogenated hydrocarbon compound such as o-dichlorobenzene, methylene chloride, 1,2-dichlorobenzene, carbon tetrachloride, and dichloroethane, and the like.

The inert organic solvent (Y) is preferably an aromatic hydrocarbon compound that has a boiling point of about 50 to 200° C. and is liquid at room temperature. More specifically, the inert organic solvent (Y) is preferably one or more compounds selected from hexane, heptane, octane, ethylcyclohexane, toluene, xylene, and ethylbenzene.

The production method 1 includes polymerizing an olefin after bringing the organoaluminum compound (B) and the external electron donor compound (C) into contact with the solid catalyst component (A) according to one embodiment of the invention in the presence of the inert organic solvent (Y). The production method 2 includes bringing the organoaluminum compound (B) and the external electron donor compound (C) into contact with the solid catalyst component (A) according to one embodiment of the invention in the presence of a gaseous olefin to polymerize the olefin.

The olefin may be polymerized by homopolymerization or copolymerization (random copolymerization or block copolymerization).

The olefin that is polymerized using the production method 1 and the production method 2 may be one or more olefins selected from ethylene, propylene, 1-butene, 1-pentene, 4-methyl-1-pentene, vinylcyclohexane, and the like. Among these, propylene is particularly preferable.

When propylene is copolymerized with another olefin, the olefin that is copolymerized with propylene may be one or more olefins selected from ethylene, propylene, 1-butene, 1-pentene, 4-methyl-1-pentene, vinylcyclohexane, and the like. Among these, ethylene and 1-butene are preferable.

When propylene is copolymerized with another olefin, propylene may be copolymerized by random copolymerization that polymerizes propylene and a small amount of ethylene, or may be copolymerized by propylene-ethylene block copolymerization that polymerizes propylene in a first stage (first polymerization tank), and copolymerizes propylene and ethylene in a second stage (second polymerization tank) or a multi-stage (multi-stage polymerization tank).

An alcohol may be added to the polymerization system in order to prevent formation of a gel in the final product when shifting from homopolymerization of propylene to block copolymerization. Specific examples of the alcohol include ethyl alcohol, isopropyl alcohol, and the like. The alcohol is preferably used in an amount of 0.01 to 10 mol, and more preferably 0.1 to 2 mol, based on 1 mol of titanium atoms included in the catalyst component (A).

The components may be used in an arbitrary ratio as long as the advantageous effects of the invention are not affected. The component (B) is normally used in an amount of 1 to 2,000 mol, and preferably 50 to 1,000 mol, based on 1 mol of titanium atoms included in the component (A). The component (C) is used in an amount of 0.002 to 10 mol, preferably 0.01 to 2 mol, and particularly preferably 0.1 to 0.5 mol, based on 1 mol of the component (B).

The production method 1 includes polymerizing an olefin after bringing the organoaluminum compound (B) and the external electron donor compound (C) into contact with the solid catalyst component (A) according to one embodiment of the invention in the presence of the inert organic solvent (Y). The production method 2 includes bringing the organoaluminum compound (B) and the external electron donor compound (C) into contact with the solid catalyst component (A) according to one embodiment of the invention in the presence of a gaseous olefin to polymerize the olefin.

When implementing the production method 1 and the production method 2, the components may be brought into contact with each other in an arbitrary order. It is preferable to add the organoaluminum compound (B) to the polymerization system, add the external electron donor compound (C) to the polymerization system, and bring the solid catalyst component (A) into contact with the mixture.

When implementing the production method 1 and the production method 2, the components may be brought into contact with each other, and the olefin may be polymerized in the presence or absence of an organic solvent. When implementing the production method 1, the components are brought into contact with each other, and the olefin is polymerized in the presence of at least the inert organic solvent (Y).

The olefin such as propylene may be polymerized in a gaseous state or a liquid state. When implementing the production method 2, the olefin is polymerized in the presence of at least a gaseous olefin.

When implementing the production method 1 and the production method 2, the olefin is preferably polymerized at a temperature from room temperature to 200° C., and more preferably polymerized at a temperature from room temperature to 100° C.

When implementing the production method 1 and the production method 2, the polymerization pressure when polymerizing the olefin is preferably 10 MPa or less, and more preferably 6 MPa or less.

When implementing the production method 1 and the production method 2, the olefin may be polymerized using a continuous polymerization method, or may be polymerized using a batch polymerization method. The polymerization reaction may be effected in a single stage, or may be effected in two or more stages.

When the olefin is polymerized using the polymerization catalyst that includes the solid catalyst component (A) according to one embodiment of the invention, the organoaluminum compound (B), and the external electron donor compound (C) (hereinafter may be referred to as "main polymerization"), preliminary polymerization may be effected prior to the main polymerization in order to further improve the catalytic activity, the stereoregularity, and the particle properties, for example.

An olefin that is subjected to the main polymerization, or a monomer such as styrene, may be used for the preliminary polymerization. The olefin that is subjected to the preliminary polymerization may be part of the olefin that is subjected to the main polymerization, or may be the entirety of the olefin that is subjected to the main polymerization.

More specifically, the solid catalyst component (A) according to one embodiment of the invention, the organoaluminum compound (B), and the external electron donor compound (C) are brought into contact with each other in the presence of the olefin to effect the preliminary polymerization to produce a polyolefin in an amount of 0.1 to 100 g based on 1 g of the solid catalyst component (A) according to one embodiment of the invention, and the organoaluminum compound (B) and the external electron donor compound (C) are brought into contact with the mixture to produce a catalyst and effect the main polymerization.

The components and the monomer may be brought into contact with each other in an arbitrary order during the preliminary polymerization. For example, the organoaluminum compound (B) is added to the preliminary polymerization system, the solid catalyst component (A) according to one embodiment of the invention is brought into contact with the organoaluminum compound (B), and one or more olefins (e.g., propylene) are brought into contact with the mixture. The preliminary polymerization temperature is not particularly limited, but is preferably −10 to 70° C., and more preferably 0 to 50° C.

When implementing the production method 1 and the production method 2, the solid catalyst component (A) according to one embodiment of the invention, the organoaluminum compound (B), and the external electron donor compound (C) may be brought into contact with each other, and the polymerization reaction (e.g., main polymerization or preliminary polymerization) may be effected in an inert gas atmosphere or an olefin (e.g., propylene) gas atmosphere.

Since the production method 1 and the production method 2 use the solid catalyst component (A) according to one embodiment of the invention as the solid catalyst component, it is possible to achieve a catalytic activity equal to that achieved when an electron donor that includes a phthalic acid ester is used, produce a polymer that exhibits excellent stereoregularity, bulk density, hydrogen response, and the like, and easily and inexpensively produce an olefin polymer using the solid catalyst component for olefin polymerization, even when a polymerization catalyst is produced in an inert atmosphere, and polymerization is effected using the resulting polymerization catalyst.

Since the production method 1 and the production method 2 use the solid catalyst component (A) according to one embodiment of the invention as the solid catalyst component, and the solid catalyst component (A) according to one embodiment of the invention includes a specific amount of electron donor compound (c), the polymerization catalyst that includes the solid catalyst component exhibits excellent catalytic activity, and it is possible to produce a polymer that exhibits excellent stereoregularity, bulk density, hydrogen response, and the like, even when drying under reduced pressure is omitted after production of the catalyst.

The embodiments of the invention thus provide a method that can easily and inexpensively produce an olefin polymer using the solid catalyst component for olefin polymerization that includes an electron donor compound other than a phthalic acid ester, exhibits a catalytic activity equal to that achieved when an electron donor compound that includes a phthalic acid ester is used, and can produce a polymer that exhibits excellent stereoregularity, bulk density, and the like, even when a polymerization catalyst is produced in an inert atmosphere.

EXAMPLES

The invention is further described below by way of examples and comparative examples. Note that the invention is not limited to the following examples.

In the examples and the comparative examples, the titanium content in the catalyst component or the solid catalyst component refers to a value measured in accordance with the method (oxidation-reduction titration) specified in JIS 8311-1997 ("Method for determination of titanium in titanium ores").

Example 1

Production of Catalyst Component

A 500 ml round-bottom flask equipped with a stirrer in which the internal atmosphere had been sufficiently replaced by nitrogen gas, was charged with 20 g of diethoxymagnesium and 60 ml of toluene to prepare a suspension.

Another 500 ml round-bottom flask equipped with a stirrer in which the internal atmosphere had been sufficiently replaced by nitrogen gas, was charged with 50 ml of toluene and 40 ml of titanium tetrachloride to prepare a solution, and the suspension prepared as described above was added to the solution. After reacting the resulting suspension at −6° C. for 1 hour, 7.0 ml of di-n-propyl 1-cyclohexene-1,2-dicarboxylate was added. After heating the mixture to 100° C., the mixture was reacted for 2 hours with stirring. After completion of the reaction, the supernatant liquid was removed. After the addition of 40 ml of titanium tetrachloride, the mixture was reacted at 100° C. for 2 hours. The resulting reaction product was washed four times with 150 ml of toluene at 100° C. and washed six times with 150 ml of n-heptane at 40° C. to obtain a catalyst component.

After performing a solid-liquid separation operation, the titanium content in the catalyst component was measured, and found to be 2.9 mass %.

Production of Solid Catalyst Component 10 g of the particulate catalyst component and 4.4 ml of vinyltrimethylsilane were introduced into a V-mixer ("Transparent Micro V-Mixer" manufactured by Tsutsui Scientific Instruments Co., Ltd.) in a nitrogen atmosphere, and mixed (rotated) at 23° C. and 30 rpm for 5 minutes in a nitrogen atmosphere in a dry state to obtain a solid catalyst component (A1). The molar ratio (amount of vinylsilane compound/amount of titanium atoms included in catalyst component) of the amount of vinylsilane compound to the amount of titanium atoms included in the catalyst component was 5.

Production of Polymerization Catalyst and Polymerization

An autoclave (internal volume: 2.0 l) equipped with a stirrer in which the internal atmosphere had been completely replaced by nitrogen gas, was charged with 1.32 mmol of triethylaluminum, 0.13 mmol of diisopropyldimethoxysilane (DIPDMS), and 0.0026 mmol (on a titanium atom basis) of the solid catalyst component (A1), which were brought into contact with each other in a nitrogen atmosphere to produce a polymerization catalyst.

After the addition of 1.5 l of hydrogen gas and 1.4 l of liquefied propylene, preliminary polymerization was effected at 20° C. for 5 minutes. After heating the mixture, a polymerization reaction was effected at 75° C. for 1 hour. The polymerization activity per gram of the solid catalyst component, the p-xylene-soluble content (XS) in the resulting polymer, the melt flow rate (MFR) of the polymer, and the bulk density (BD) of the polymer were measured as described below. The results are listed in Table 1.

Polymerization Activity Per Gram of Solid Catalyst Component

The polymerization activity per gram of the solid catalyst component was calculated using the following expression.

Polymerization activity (g-pp/g-catalyst)=mass (g) of polymer/mass (g) of solid catalyst component Measurement of Xylene-Soluble Content (XS) in Polymer A flask equipped with a stirrer was charged with 4.0 g of the polymer (polypropylene) and 200 ml of p-xylene. The external temperature was increased to be equal to or higher than the boiling point (about 150° C.) of xylene, and the polymer was dissolved over 2 hours in a state in which p-xylene contained in the flask was maintained at a temperature (137 to 138° C.) lower than the boiling point. The solution was cooled to 23° C. over 1 hour, and an insoluble component and a soluble component were separated by filtration. A solution including the soluble component was collected, and p-xylene was evaporated by heating and drying under reduced pressure. The mass of the residue (xylene-soluble component) was calculated as a value (mass %) relative to the mass of the polymer (polypropylene), and taken as the xylene-soluble content (XS).

Melt Flow Rate (MFR) of Polymer

The melt flow rate (MFR) (melt flow index) of the polymer was measured in accordance with ASTM D1238 (JIS K 7210).

Bulk Density (BD) of Polymer

The bulk density (BD) of the polymer was measured in accordance with JIS K 6721.

Example 2

Production of Catalyst Component and Solid Catalyst Component

A catalyst component and a solid catalyst component (A2) were produced in the same manner as in Example 1, except that 5-t-butyl-1,2-phenylenediethyl carbonate was used instead of 7.0 ml of di-n-propyl 1-cyclohexene-1,2-dicarboxylate in an equimolar amount. The titanium content in the resulting catalyst component was 2.8 mass %.

Production of Polymerization Catalyst and Polymerization

A polymerization catalyst was produced, polymerization was effected, and the resulting polymer was evaluated in the same manner as in Example 1, except that the solid catalyst component (A2) was used instead of the solid catalyst component (A1), and cyclohexylmethyldimethoxysilane (CMDMS) was used instead of diisopropyldimethoxysilane in an equimolar amount. The results are listed in Table 1.

Example 3

Production of Catalyst Component and Solid Catalyst Component

A catalyst component and a solid catalyst component (A3) were produced in the same manner as in Example 1, except that diethyl 2,3-diisopropylsuccinate was used instead of 7.0 ml of di-n-propyl 1-cyclohexene-1,2-dicarboxylate in an equimolar amount. The titanium content in the resulting catalyst component was 12 mass %.

Production of Polymerization Catalyst and Polymerization

A polymerization catalyst was produced, polymerization was effected, and the resulting polymer was evaluated in the same manner as in Example 1, except that the solid catalyst component (A3) was used instead of the solid catalyst component (A1), and dicyclopentyldimethoxysilane (DCPDMS) was used instead of diisopropyldimethoxysilane in an equimolar amount. The results are listed in Table 1.

Example 4

Production of Catalyst Component

A catalyst component was produced in the same manner as in Example 1, except that ethyl 3-ethoxy-2-t-butylpropionate was used instead of 7.0 ml of di-n-propyl 1-cyclohexene-1,2-dicarboxylate in an equimolar amount. The titanium content in the resulting catalyst component was 2.7 mass %.

Production of Solid Catalyst Component

A solid catalyst component (A4) was produced in the same manner as in Example 1, except that dimethyldivinylsilane was used instead of vinyltrimethylsilane in an equimolar amount.

Production of Polymerization Catalyst and Polymerization

A polymerization catalyst was produced, polymerization was effected, and the resulting polymer was evaluated in the same maimer as in Example 1, except that the solid catalyst component (A4) was used instead of the solid catalyst component (A1). The results are listed in Table 1.

Example 5

Production of Catalyst Component

A catalyst component was produced in the same manner as in Example 1, except that 2-isopropyl-2-isopentyl-1,3-dimethoxypropane was used instead of 7.0 ml of di-n-propyl 1-cyclohexene-1,2-dicarboxylate in an equimolar amount. The titanium content in the resulting catalyst component was 3.2 mass %.

Production of Solid Catalyst Component

A solid catalyst component (A5) was produced in the same manner as in Example 1, except that methyltrivinylsilane was used in instead of vinyltrimethylsilane, and the molar ratio of the amount of vinylsilane compound to the amount of titanium atoms included in the catalyst component was changed to 2.

Production of Polymerization Catalyst and Polymerization

A polymerization catalyst was produced, polymerization was effected, and the resulting polymer was evaluated in the same manner as in Example 1, except that the solid catalyst component (A5) was used instead of the solid catalyst component (A1), and cyclohexylmethyldimethoxysilane was used instead of diisopropyldimethoxysilane in an equimolar amount. The results are listed in Table 1.

Example 6

Production of Catalyst Component and Solid Catalyst Component

A catalyst component was produced in the same manner as in Example 1, except that 2-benzyloxyethyl phenyl carbonate was used instead of 7.0 ml of di-n-propyl 1-cyclohexene-1,2-dicarboxylate in an equimolar amount, and a solid catalyst component (A6) was produced in the same manner as in Example 1, except that the resulting catalyst component was used. The titanium content in the resulting solid catalyst component was 2.8 mass %.

Production of Polymerization Catalyst and Polymerization

A polymerization catalyst was produced, polymerization was effected, and the resulting polymer was evaluated in the same manner as in Example 1, except that the solid catalyst component (A6) was used instead of the solid catalyst component (A1), and cyclohexylmethyldimethoxysilane (CMDMS) was used instead of diisopropyldimethoxysilane in an equimolar amount. The results are listed in Table 1.

Example 7

A catalyst component was produced, a solid catalyst component was produced, a polymerization catalyst was produced, polymerization was effected, and the resulting polymer was evaluated in the same manner as in Example 1, except that the amount of trimethylvinylsilane was changed so that the molar ratio (amount of vinylsilane compound/amount of titanium atoms included in catalyst component) of the amount of vinylsilane compound to the amount of titanium atoms included in the catalyst component was 1. The results are listed in Table 1.

Example 8

A catalyst component was produced, a solid catalyst component was produced, a polymerization catalyst was produced, polymerization was effected, and the resulting polymer was evaluated in the same manner as in Example 1, except that the amount of trimethylvinylsilane was changed so that the molar ratio (amount of vinylsilane compound/amount of titanium atoms included in catalyst component) of the amount of vinylsilane compound to the amount of titanium atoms included in the catalyst component was 2. The results are listed in Table 1.

Example 9

A catalyst component was produced, a solid catalyst component was produced, a polymerization catalyst was produced, polymerization was effected, and the resulting polymer was evaluated in the same manner as in Example 1, except that the amount of trimethylvinylsilane was changed so that the molar ratio (amount of vinylsilane compound/amount of titanium atoms included in solid component) of the amount of vinylsilane compound to the amount of titanium atoms included in the solid component was 15. The results are listed in Table 1.

Comparative Example 1

A catalyst component was produced, a solid catalyst component was produced, a polymerization catalyst was produced, polymerization was effected, and the resulting polymer was evaluated in the same manner as in Example 1, except that vinyltrimethylsilane was not used when producing the solid catalyst component. The results are listed in Table 2.

Comparative Example 2

A catalyst component was produced, a solid catalyst component was produced, a polymerization catalyst was produced, polymerization was effected, and the resulting polymer was evaluated in the same manner as in Example 2, except that vinyltrimethylsilane was not used when producing the solid catalyst component. The results are listed in Table 2.

Comparative Example 3

A catalyst component was produced, a solid catalyst component was produced, a polymerization catalyst was produced, polymerization was effected, and the resulting polymer was evaluated in the same manner as in Example 3, except that vinyltrimethylsilane was not used when producing the solid catalyst component. The results are listed in Table 2.

Comparative Example 4

A catalyst component was produced, a solid catalyst component was produced, a polymerization catalyst was produced, polymerization was effected, and the resulting polymer was evaluated in the same manner as in Example 4, except that vinyltrimethylsilane was not used when producing the solid catalyst component. The results are listed in Table 2.

Comparative Example 5

A catalyst component was produced, a solid catalyst component was produced, a polymerization catalyst was produced, polymerization was effected, and the resulting polymer was evaluated in the same manner as in Example 5, except that vinyltrimethylsilane was not used when producing the solid catalyst component. The results are listed in Table 2.

Comparative Example 6

A catalyst component was produced, a solid catalyst component was produced, a polymerization catalyst was produced, polymerization was effected, and the resulting polymer was evaluated in the same manner as in Example 6, except that vinyltrimethylsilane was not used when producing the solid catalyst component. The results are listed in Table 2.

Comparative Example 7

Production of Catalyst Component and Solid Catalyst Component

A catalyst component and a solid catalyst component (A7) were produced in the same manner as in Example 1, except that di-n-butyl phthalate was used instead of 7.0 ml of di-n-propyl 1-cyclohexene-1,2-dicarboxylate in an equimolar amount, and vinyltrimethylsilane was not used when producing the solid catalyst component. The titanium content in the resulting solid catalyst component was 2.4 mass %.

Production of Polymerization Catalyst and Polymerization

A polymerization catalyst was produced, polymerization was effected, and the resulting polymer was evaluated in the same manner as in Example 1, except that the solid catalyst component (A7) was used instead of the solid catalyst component (A1), and cyclohexylmethyldimethoxysilane was used instead of diisopropyldimethoxysilane in an equimolar amount. The results are listed in Table 2.

Comparative Example 8

A catalyst component was produced, a solid catalyst component was produced, a polymerization catalyst was produced, polymerization was effected, and the resulting polymer was evaluated in the same manner as in Example 1, except that the amount of trimethylvinylsilane was changed so that the molar ratio (amount of vinylsilane compound/amount of titanium atoms included in catalyst component) of the amount of vinylsilane compound to the amount of titanium atoms included in the catalyst component was 0.05. The results are listed in Table 2.

Comparative Example 9

A catalyst component was produced, a solid catalyst component was produced, a polymerization catalyst was produced, polymerization was effected, and the resulting polymer was evaluated in the same manner as in Example 3, except that the amount of trimethylvinylsilane was changed so that the molar ratio (amount of vinylsilane compound/amount of titanium atoms included in catalyst component) of the amount of vinylsilane compound to the amount of titanium atoms included in the catalyst component was 30. The results are liked in Table 2.

Example 10

Production of Catalyst Component

A 500 ml round-bottom flask equipped with a stirrer in which the internal atmosphere had been sufficiently replaced by nitrogen gas, was charged with 20 g of diethoxymagnesium and 60 ml of toluene to prepare a suspension. Another 500 ml round-bottom flask equipped with a stirrer in which the internal atmosphere had been sufficiently replaced by nitrogen gas, was charged with 50 ml of toluene and 40 ml of titanium tetrachloride to prepare a solution, and the suspension prepared as described above was added to the solution. After reacting the resulting suspension at −6° C. for 1 hour, 2.3 ml of 2-ethoxyethyl 1-methyl carbonate and 0.9 ml of 2-isopropyl-2-isopentyl-1,3-dimethoxypropane were added. After heating the mixture to 100° C., the mixture was reacted for 2 hours with stirring. After completion of the reaction, the supernatant liquid was removed, and the residue was washed four times with 150 ml of toluene at 90° C. After the addition of 20 ml of titanium tetrachloride and 100 ml of toluene to the resulting reaction product, the mixture was heated to 100° C., and reacted for 15 minutes. This operation was performed four times. The resulting product was washed six times with 150 ml of n-heptane at 40° C. to obtain a catalyst component.

After performing a solid-liquid separation operation, the titanium content in the catalyst component was measured, and found to be 2.7 mass %.

Production of Solid Catalyst Component 10 g of the particulate catalyst component and 4.4 ml of vinyltrimethylsilane to were introduced into a V-mixer ("Transparent Micro V-Mixer" manufactured by Tsutsui Scientific Instruments Co., Ltd.) in a nitrogen atmosphere, and mixed (rotated) at 23° C. and 30 rpm for 5 minutes in a nitrogen atmosphere in a dry state to obtain a solid catalyst component (A10). The molar ratio (amount of vinylsilane compound/amount of titanium atoms included in catalyst component) of the amount of vinylsilane compound to the amount of titanium atoms included in the catalyst component was 5.

Production of Polymerization Catalyst and Polymerization

A polymerization catalyst was produced, polymerization was effected, and the resulting polymer was evaluated in the same manner as in Example 1, except that the solid catalyst component (A10) was used instead of the solid catalyst component (A1), and cyclohexylmethyldimethoxysilane was used instead of diisopropyldimethoxysilane in an equimolar amount. The results are listed in Table 2.

Example 11

A catalyst component was produced, a solid catalyst component was produced, a polymerization catalyst was produced, polymerization was effected, and the resulting polymer was evaluated in the same manner as in Example 10, except that the amount of trimethylvinylsilane was changed so that the molar ratio (amount of vinylsilane compound/amount of titanium atoms included in catalyst component) of the amount of vinylsilane compound to the amount of titanium atoms included in the catalyst component was 10. The results are listed in Table 1.

Example 12

Production of Catalyst Component and Solid Catalyst Component

A solid catalyst component (A12) was produced in the same manner as in Example 10, except that dichlorodivinylsilane was used instead of vinyltrimethylsilane in an equimolar amount.

Production of Polymerization Catalyst and Polymerization

A polymerization catalyst was produced, polymerization was effected, and the resulting polymer was evaluated in the same manner as in Example 10, except that the solid catalyst component (A12) was used instead of the solid catalyst component (A1). The results are listed in Table 1.

Example 13

Production of Catalyst Component and Solid Catalyst Component

A catalyst component and a solid catalyst component (A13) were produced in the same manner as in Example 10, except that 2-ethoxyethyl 1-ethyl carbonate was used instead of 2.3 ml of 2-ethoxyethyl 1-methyl carbonate in an equimolar amount. The titanium content in the resulting solid catalyst component was 2.6 mass %.

Production of Polymerization Catalyst and Polymerization

A polymerization catalyst was produced, polymerization was effected, and the resulting polymer was evaluated in the same manner as in Example 10, except that the solid catalyst component (A13) was used instead of the solid catalyst component (A1), and the amount of trimethylvinylsilane was changed so that the molar ratio (amount of vinylsilane compound/amount of titanium atoms included in catalyst component) of the amount of vinylsilane compound to the amount of titanium atoms included in the catalyst component was 0.5. The results are listed in Table 1.

Example 14

Production of Catalyst Component and Solid Catalyst Component

A catalyst component and a solid catalyst component (A14) were produced in the same manner as in Example 10, except that diethyl 1-cyclohexene-1,2-dicarboxylate was used instead of 0.9 ml of 2-isopropyl-2-isopentyl-1,3-dimethoxypropane in an equimolar amount. The titanium content in the resulting solid catalyst component was to 1.6 mass %.

Production of Polymerization Catalyst and Polymerization

A polymerization catalyst was produced, polymerization was effected, and the resulting polymer was evaluated in the same manner as in Example 10, except that the solid catalyst component (A14) was used instead of the solid catalyst component (A1), and dicyclopentyldimethoxysilane was used instead of diisopropyldimethoxysilane in an equimolar amount. The results are listed in Table 1.

Example 15

Production of Catalyst Component and Solid Catalyst Component

A catalyst component and a solid catalyst component (A15) were produced in the same manner as in Example 10, except that diethyl 2,3-diisopropylsuccinate was used instead of 2.3 ml of 2-ethoxyethyl 1-methyl carbonate in an equimolar amount. The titanium content in the resulting solid catalyst component was 3.0 mass %.

Production of Polymerization Catalyst and Polymerization

A polymerization catalyst was produced, polymerization was effected, and the resulting polymer was evaluated in the same manner as in Example 10, except that the solid catalyst component (A15) was used instead of the solid catalyst component (A1), and dicyclopentyldimethoxysilane was used instead of diisopropyldimethoxysilane in an equimolar amount. The results are listed in Table 1.

Comparative Example 10

A catalyst component was produced, a solid catalyst component was produced, a polymerization catalyst was produced, polymerization was effected, and the resulting polymer was evaluated in the same manner as in Example 10, except that vinyltrimethylsilane was not used when producing the solid catalyst component. The results are listed in Table 2.

Comparative Example 11

A catalyst component was produced, a solid catalyst component was produced, a polymerization catalyst was produced, polymerization was effected, and the resulting polymer was evaluated in the same manner as in Example 10, except that 1.5 ml of triethylaluminum was used instead of vinyltrimethylsilane when producing the solid catalyst component. The results are listed in Table 2.

Comparative Example 12

A catalyst component was produced, a solid catalyst component was produced, a polymerization catalyst was produced, polymerization was effected, and the resulting polymer was evaluated in the same manner as in Example 14, except that vinyltrimethylsilane was not used when producing the solid catalyst component. The results are listed in Table 2.

Comparative Example 13

A catalyst component was produced, a solid catalyst component was produced, a polymerization catalyst was produced, polymerization was effected, and the resulting polymer was evaluated in the same manner as in Example 15, except that vinyltrimethylsilane was not used when producing the solid catalyst component. The results are listed in Table 2.

Example 16

Production of Catalyst Component 75 g of anhydrous magnesium chloride, 375 ml of decane, and 300 g of 2-ethylhexyl alcohol were heated at 135° C. for 4 hours to obtain a homogeneous solution, and 16.7 ml of 2-ethoxyethyl 1-methyl carbonate was added to the solution. The homogeneous solution thus obtained was cooled to room temperature, and 113 ml of the homogeneous solution was added dropwise to 300 ml of titanium tetrachloride held at −20° C. over 45 minutes. After the dropwise addition, the mixture was heated to 110° C. over 4 hours, and 1.6 ml of 2-isopropyl-2-isopentyl-1,3-dimethoxypropane and 0.9 ml of 2-ethoxyethyl 1-methyl carbonate were added to the mixture. The mixture was stirred at 110° C. for 2 hours, and filtered, and the solid was washed with decane to obtain a catalyst component. The titanium content in the catalyst component was 1.8 wt %.

Production of Solid Catalyst Component Production of Polymerization Catalyst, and Polymerization A solid catalyst component (A16) was produced in the same manner as in Example 1, except that the resulting catalyst component was used. A polymerization catalyst was produced, polymerization was effected, and the resulting polymer was evaluated in the same manner as in Example 1, except that the solid catalyst component (A16) was used instead of the solid catalyst component (A1), and dicyclopentyldimethoxysilane was used instead of diisopropyldimethoxysilane in an equimolar amount. The results are listed in Table 1.

Comparative Example 14

A catalyst component was produced, a solid catalyst component was produced, a polymerization catalyst was produced, polymerization was effected, and the resulting polymer was evaluated in the same manner as in Example 16, except that vinyltrimethylsilane was not used when producing the solid catalyst component. The results are listed in Table 2.

Example 17

Production of Catalyst Component

A 500 ml round-bottom flask equipped with a stirrer in which the internal atmosphere had been sufficiently replaced by nitrogen gas, was charged with 20 g of diethoxymagnesium and 60 ml of toluene to prepare a suspension. Another 500 ml round-bottom flask equipped with a stirrer in which the internal atmosphere had been sufficiently replaced by nitrogen gas, was charged with 50 ml of toluene and 40 ml of titanium tetrachloride to prepare a solution, and the suspension prepared as described above was added to the solution. After reacting the resulting suspension at −6° C. for 1 hour, 2.3 ml of 2-ethoxyethyl 1-methyl carbonate and 0.9 ml of 2-isopropyl-2-isopentyl-1,3-dimethoxypropane were added. After heating the mixture to 100° C., the mixture was reacted for 2 hours with stirring. After completion of the reaction, the supernatant liquid was removed, and the residue was washed four times with 150 ml of toluene at 90° C. After the addition of 20 ml of titanium tetrachloride and 100 ml of toluene to the resulting reaction product, the mixture was heated to 100° C., and reacted for 15 minutes. This operation was performed four times. The resulting product was washed six times with 150 ml of n-heptane at 40° C. to obtain a catalyst component. After performing a solid-liquid separation operation, the titanium content in the catalyst component was measured, and found to be 2.7 mass %.

Production of Solid Catalyst Component 10 g of the particulate catalyst component and 4.4 ml of vinyltrimethylsilane were introduced into a V-mixer ("Transparent Micro V-Mixer" manufactured by Tsutsui Scientific Instruments Co., Ltd.) in a nitrogen atmosphere, and mixed (rotated) at 23° C. and 30 rpm for 5 minutes in a nitrogen atmosphere in a dry state to obtain a solid catalyst component (A17).

The molar ratio (amount of vinylsilane compound/amount of titanium atoms included in catalyst component) of the amount of vinylsilane compound to the amount of titanium atoms included in the catalyst component was 5.

Production of Polymerization Catalyst and Polymerization

A 100 ml round-bottom flask in which the internal atmosphere had been sufficiently replaced by nitrogen gas, was charged with 10 g of the solid catalyst component (A17) and 23 g of a mineral oil ("Hydrobrite 380" manufactured by Shima Trading Co., Ltd.) to prepare a suspension.

An autoclave (internal volume: 2.0 l) equipped with a stirrer in which the internal atmosphere had been completely replaced by nitrogen gas, was charged with 7 ml of n-heptane, 1.32 mmol of triethylaluminum, and 0.13 mmol of cyclohexylmethyldimethoxysilane. 0.0026 mmol (on a titanium atom basis) of the solid catalyst component (A17) (suspension) was brought into contact with the mixture at 20° C. for 10 hours in a nitrogen atmosphere to produce a polymerization catalyst (washing was not performed).

Polymerization was effected, and the resulting polymer was evaluated in the same manner as in Example 1. The results are listed in Table 1.

TABLE 1

| | Si/Ti* | Polymerization activity (g/g) | Melt flow rate (MFR) of polymer (g/10 min) | Xylene-soluble content (XS) in polymer (mass %) |
|---|---|---|---|---|
| Example 1 | 5 | 41,600 | 6.9 | 2.4 |
| Example 2 | 5 | 38,400 | 16 | 2.9 |
| Example 3 | 5 | 44,500 | 3.5 | 1.1 |
| Example 4 | 5 | 57,800 | 8 | 2.7 |
| Example 5 | 2 | 43,700 | 26 | 1.1 |
| Example 6 | 5 | 45,600 | 10 | 1.4 |
| Example 7 | 1 | 31,000 | 10 | 1.8 |
| Example 8 | 2 | 44,200 | 8.8 | 1.2 |
| Example 9 | 15 | 44,200 | 7.8 | 1.3 |
| Example 10 | 5 | 51,800 | 25 | 1.5 |
| Example 11 | 10 | 52,700 | 20 | 1.7 |
| Example 12 | 5 | 34,900 | 21 | 1.5 |
| Example 13 | 0.5 | 30,600 | 17 | 1.3 |
| Example 14 | 5 | 48,900 | 4.2 | 0.8 |
| Example 15 | 5 | 52,100 | 3.3 | 0.9 |
| Example 16 | 5 | 48,500 | 20 | 1.5 |
| Example 17 | 5 | 53,200 | 25 | 1.4 |

*The molar quantity of the vinylsilane compound (d) with respect to the molar quantity (on a titanium atom basis) of the titanium halide compound (b) included in the catalyst component.

TABLE 2

| | Si/Ti* | Polymerization activity (g/g) | Melt flow rate (MFR) of polymer (g/10 min) | Xylene-soluble content (XS) in polymer (mass %) |
|---|---|---|---|---|
| Comparative Example 1 | 0 | 30,400 | 9.7 | 2.3 |
| Comparative Example 2 | 0 | 18,800 | 20 | 3.1 |
| Comparative Example 3 | 0 | 29,400 | 3.8 | 1.4 |
| Comparative Example 4 | 0 | 31,500 | 15 | 2.6 |
| Comparative Example 5 | 0 | 36,100 | 24 | 1.4 |
| Comparative Example 6 | 0 | 23,600 | 11 | 1.6 |
| Comparative Example 7 | 0 | 33,800 | 7.2 | 1.1 |
| Comparative Example 8 | 0.05 | 29,800 | 7.3 | 2.1 |

TABLE 2-continued

| | Si/Ti* | Polymerization activity (g/g) | Melt flow rate (MFR) of polymer (g/10 min) | Xylene-soluble content (XS) in polymer (mass %) |
|---|---|---|---|---|
| Comparative Example 9 | 30 | 27,900 | 3.2 | 1.5 |
| Comparative Example 10 | 0 | 29,400 | 27 | 2.4 |
| Comparative Example 11 | 0 | 1,500 | 50 | 5.5 |
| Comparative Example 12 | 0 | 25,000 | 5 | 1.0 |
| Comparative Example 13 | 0 | 31,300 | 3.8 | 1.0 |
| Comparative Example 14 | 0 | 28,400 | 27 | 1.7 |

*The molar quantity of the vinylsilane compound (d) with respect to the molar quantity (on a titanium atom basis) of the titanium halide compound (b) included in the catalyst component.

As is clear from the results listed in Table 1, the solid catalyst components for olefin polymerization obtained in Examples 1 to 17 that were produced by bringing the vinylsilane compound (d) into contact with the catalyst component, the catalyst component being a powdery solid component obtained by bringing the magnesium compound, the titanium halide compound, and the electron donor compound into contact with each other, the electron donor compound being one or more compounds that do not include a phthalic acid ester structure, and include one or more groups selected from specific groups, the vinylsilane compound (d) being brought into contact with the catalyst component in a 0.1 to 15-fold molar quantity with respect to the molar quantity (on a titanium atom basis) of the titanium halide compound (b) included in the catalyst component, exhibited excellent catalytic activity in the same manner as in the case where an electron donor compound that includes a phthalic acid ester is used, and could produce a polymer exhibiting excellent stereoregularity, bulk density, and the like, even when the polymerization catalyst was produced in an inert atmosphere, when the solid catalyst component included an electron donor compound other than a phthalic acid ester, and an organosilicon compound, and it was possible to easily and inexpensively produce an olefin polymer using the solid catalyst component for olefin polymerization.

As is clear from the results listed in Table 1, the solid catalyst components for olefin polymerization obtained in Comparative Examples 1 to 14 that were produced without bringing the vinylsilane compound (d) into contact with the catalyst component, or produced by bringing the vinylsilane compound (d) into contact with the catalyst component in less than a 0.1-fold molar quantity, or more than a 15-fold molar quantity, with respect to the molar quantity (on a titanium atom basis) of the titanium halide compound (b) included in the catalyst component, had a problem in that, when a polymerization catalyst was produced in an inert gas atmosphere (e.g., nitrogen atmosphere), the titanium active sites were poisoned, or protected to a large extent, and the polymerization catalyst did not exhibit the desired catalytic performance (i.e., significant decrease in activity occurred).

INDUSTRIAL APPLICABILITY

The embodiments of the invention thus provide a solid catalyst component for olefin polymerization that exhibits excellent catalytic activity during polymerization, and can produce a polymer that exhibits excellent stereoregularity, bulk density, and the like, even when a polymerization catalyst is produced in an inert atmosphere, when the solid catalyst component includes an electron donor compound other than a phthalic acid ester, and an organosilicon compound, a method for producing an olefin polymerization catalyst, and a method that easily and inexpensively produces an olefin polymer using the solid catalyst component for olefin polymerization.

The invention claimed is:

1. A solid catalyst component for olefin polymerization that is produced by bringing a vinylsilane compound (d) into contact with a catalyst component, the catalyst component being a powdery solid component obtained by bringing a magnesium compound (a), a titanium halide compound (b), and an electron donor compound (c) into contact with each other, the electron donor compound (c) being one or more compounds that do not comprise a phthalic acid ester structure, and comprise one or more groups selected from an ester group, a carbonate group, and an ether group, the vinylsilane compound (d) being brought into contact with the catalyst component in a 0.5 to 15-fold molar quantity with respect to the molar quantity (on a titanium atom basis) of the titanium halide compound (b) included in the catalyst component.

2. The solid catalyst component for olefin polymerization according to claim 1, wherein the electron donor compound (c) is at least one compound selected from a succinic acid ester, a maleic acid ester, a cyclohexenecarboxylic acid ester, an ether carboxylic acid ester, a dicarbonate, and an ether carbonate.

3. The solid catalyst component for olefin polymerization according to claim 1, wherein the vinylsilane compound (d) is a compound represented by a general formula (I),

wherein $R^1$ is a hydrogen atom or a hydrocarbon residue having 1 to 20 carbon atoms, X is a halogen atom, p is a number from 1 to 4, q is a number that satisfies $p+q \leq 4$, provided that a plurality of $R^1$ are either identical to or different from each other when a plurality of $R^1$ are present, and a plurality of X are either identical to or different from each other when a plurality of X are present.

4. The solid catalyst component for olefin polymerization according to claim 1, wherein the vinylsilane compound (d) is a compound represented by a general formula (II),

wherein $R^2$, $R^3$, and $R^4$ are independently a hydrogen atom, or a group selected from a group derived from a saturated hydrocarbon compound having 1 to 10 carbon atoms, a group derived from a halogen-containing saturated hydrocarbon compound having 1 to 10 carbon atoms, a group derived from an aromatic hydrocarbon compound having 6 to 20 carbon atoms, and a group derived from a halogen-containing aromatic hydrocarbon compound having 6 to 20 carbon atoms, provided that $R^2$, $R^3$, and $R^4$ are either identical to or different from each other.

5. The solid catalyst component for olefin polymerization according to claim 1, the solid catalyst component being produced by bringing the vinylsilane compound (d) into contact with the catalyst component at a temperature of 0 to 80° C. for 1 minute or more in the absence of an organoaluminum compound (B) and an external electron donor compound (C).

6. A method for producing an olefin polymerization catalyst comprising:
bringing a vinylsilane compound (d) into contact with a catalyst component in the absence of an organoaluminum compound and an external electron donor compound, the catalyst component being a powdery catalyst component obtained by bringing a magnesium compound (a), a titanium halide compound (b), and an electron donor compound (c) into contact with each other, the electron donor compound (c) being one or more compounds that do not comprise a phthalic acid ester structure, and comprise one or more groups selected from an ester group, a carbonate group, and an ether group, the vinylsilane compound (d) being brought into contact with the catalyst component in a 0.5 to 15-fold molar quantity with respect to the molar quantity (on a titanium atom basis) of the titanium halide compound (b) included in the catalyst component; and
bringing the resulting product into contact with an organoaluminum compound (B) and an external electron donor compound (C) in the presence of an inert organic solvent (Y).

7. A method for producing an olefin polymer comprising bringing an organoaluminum compound (B) and an external electron donor compound (C) into contact with the solid catalyst component for olefin polymerization according to claim 1 in the presence of an inert organic solvent (Y), and polymerizing an olefin.

8. The method for producing an olefin polymer according to claim 7, wherein the inert organic solvent (Y) is one or more compounds selected from a saturated chain-like hydrocarbon and an alicyclic hydrocarbon.

9. A method for producing an olefin polymer comprising bringing the solid catalyst component for olefin polymerization according to claim 1 into contact with an organoaluminum compound (B) and an external electron donor compound (C) in the presence of a gaseous olefin.

10. A method for producing an olefin polymer comprising bringing an organoaluminum compound (B) and an external electron donor compound (C) into contact with the solid catalyst component for olefin polymerization according to claim 2 in the presence of an inert organic solvent (Y), and polymerizing an olefin.

11. A method for producing an olefin polymer comprising bringing an organoaluminum compound (B) and an external electron donor compound (C) into contact with the solid catalyst component for olefin polymerization according to claim 3 in the presence of an inert organic solvent (Y), and polymerizing an olefin.

12. A method for producing an olefin polymer comprising bringing an organoaluminum compound (B) and an external electron donor compound (C) into contact with the solid catalyst component for olefin polymerization according to claim 4 in the presence of an inert organic solvent (Y), and polymerizing an olefin.

13. A method for producing an olefin polymer comprising bringing an organoaluminum compound (B) and an external electron donor compound (C) into contact with the solid catalyst component for olefin polymerization according to claim 5 in the presence of an inert organic solvent (Y), and polymerizing an olefin.

14. A method for producing an olefin polymer comprising bringing the solid catalyst component for olefin polymerization according to claim 2 into contact with an organoaluminum compound (B) and an external electron donor compound (C) in the presence of a gaseous olefin.

15. A method for producing an olefin polymer comprising bringing the solid catalyst component for olefin polymerization according to claim 3 into contact with an organoaluminum compound (B) and an external electron donor compound (C) in the presence of a gaseous olefin.

16. A method for producing an olefin polymer comprising bringing the solid catalyst component for olefin polymerization according to claim 4 into contact with an organoaluminum compound (B) and an external electron donor compound (C) in the presence of a gaseous olefin.

17. A method for producing an olefin polymer comprising bringing the solid catalyst component for olefin polymerization according to claim 5 into contact with an organoaluminum compound (B) and an external electron donor compound (C) in the presence of a gaseous olefin.

* * * * *